United States Patent [19]

Chadima, Jr. et al.

[11] 4,430,700
[45] Feb. 7, 1984

[54] SYSTEM AND METHOD FOR COMMUNICATION BETWEEN NODES OF A CLOSED LOOP LOCAL COMMUNICATION PATH

[75] Inventors: George E. Chadima, Jr.; Joseph J. Kubler, both of Cedar Rapids, Iowa

[73] Assignee: Norand Corporation, Cedar Rapids, Iowa

[21] Appl. No.: 289,098

[22] Filed: Jul. 31, 1981

[51] Int. Cl.³ .......................... G06F 15/16; H04J 3/08
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,007,441 | 2/1977 | Faber | 364/200 |
| 4,007,450 | 2/1977 | Haibt et al. | 364/200 |
| 4,176,401 | 11/1979 | Lonberger | 364/900 |
| 4,195,351 | 3/1980 | Barner et al. | 364/900 |
| 4,224,684 | 9/1980 | Conner et al. | 364/900 |
| 4,227,178 | 10/1980 | Gergaud et al. | 364/900 |

OTHER PUBLICATIONS

Decentralized Request Resolution Mechanisms, IBM Technical Disclosure Bulletin, vol. 20, No. 2, Jul. 77, p. 853.
*Proc. of the Berkeley Conf. on Distrib. Data Management and Computer Networks,* 4th, Univ. of Calif. Aug. 28-30, 1979, pp. 309-321, Blauman, Sheldon "Labeled Slot Multiplexing: a Technique for a High Speed, Fiber Optic Based, Loop Network".
*Proceedings of Distributed Computing,* Compcon 80, 21st IEEE Computer Society International, 1980 pp. 507-515, Wilson, T. C. & Silio, C. B. "Distributed Control of Ring Networks using a 'Play-Through' Protocol".
*Proceedings of Distributed Computing,* Compcon 80, 21st IEEE Computer Society International, 1980, pp. 159-165, Ikeda et al., "Computer Network Coupled by 100 MBPS Optical Fiber Ring Bus-System Planning and Ring Bus Subsystem Description".
*Computer Network 4,* 1980, pp. 239-244, Saltzer, J. H. & Pogran, K. T. "A Star-Shaped Ring Network with High Maintainability".
*IEEE Transactions on Communications,* vol. COM-27, No. 4, Apr. 1979, pp. 760-761, Hopper A. & Wheeler, D. J., "Maintenance of Ring Communication Systems".
*Proc. of the Workshop on Interconnect Networks for Parallel and Distributed Processing,* Purdue Univ. Apr. 21-22, 1980, published by IEEE (Catalog N 80CH1560-2), pp. 93-100, Arden, B. W. & Lee, H. "Analysis of Chordal Ring Network".
2nd Proc., Compsac '78; IEEE Computer Soc. Int. Computer Software & Applications Conference, Chicago, Ill., published by IEEE (Catalog N 78CH1338-3C), 1978, pp. 674-679, Agrawala et al. "The Slotted Ring v the Token-Controlled Ring".
*Electronics,* Aug. 28, 1980, p. 80, "Chips, Twisted pair build simple local net".

*Primary Examiner*—Jerry Smith
*Assistant Examiner*—Michael R. Fleming
*Attorney, Agent, or Firm*—Hill, Van Santen, Steadman & Simpson

[57] ABSTRACT

In an exemplary embodiment a transmission link switch is provided at each node. In a transmission mode, the switch provides a transmission path which transmits incoming messages directly to the node output without any processing delay. In the cutoff mode of the switch, the associated data processor still receives messages from the node input, but the direct path from the node input to node output is interrupted. During the sending of messages and responses thereto, the link switches at the sending and responding nodes are operated so as to prevent the messages from making multiple traverses of the loop communications path while also avoiding the occurrence at other nodes of a communication gap which would permit such nodes to interfere with the exchange of messages. The arrangement is such that each node can be implemented with low cost integrated circuit modules.

9 Claims, 4 Drawing Figures

SYSTEM AND METHOD FOR COMMUNICATION BETWEEN NODES OF A CLOSED LOOP LOCAL COMMUNICATION PATH

BACKGROUND OF THE INVENTION

CROSS REFERENCE TO RELATED APPLICATION

A divisional application is being filed Oct. 24, 1983 directed to the subject matter of non-allowed claims herein.

The present invention relates to a system and method for communication between nodes of a closed loop local communication path.

Many efforts have been made to develop a ring type communications network because of the potential low cost and particularly because such a system can be implemented using fiber optic paths. Fiber optic data transmission is particularly attractive for a local communication system because of its immunity to electromagnetically induced noise.

The general objective of a ring distribution of processors is recognized, for example, in the text *Computer Networks and Distributed Processing*, by James Martin, Prentice-Hall, Inc., 1981, page 38, FIG. 3.2, the second illustration.

One of the traditional objections to such a ring type processing network relates to such a system wherein a central controller is required with a store and forward function with respect to each of the other nodes. In such a system, communication is dependent on the speed of operation of the central controller, and is less flexible because of the requirements that the central controller poll the recipient node prior to actual forwarding of the data. It would be desirable to avoid the use of a central controller not only for greater speed and flexibility of communication between the nodes of a closed loop communication path, but also to provide such a communication system where failure of a computer at one node would not prevent continued operation, as is the case where a central controller is present.

Other types of ring networks essentially involve a ring of data processing devices each of which must check an incoming message before forwarding it to the next node. In many check and forward systems communication is structured in relation to specified multiplex time slots or in relation to a circulating control message e.g. a so called token or "GO" control signal. In any event, complexity and added expense result from the necessity for recognizing the destination address of an incoming message within a processing cycle of brief time duration, and for selectively removing a message packet from the loop where the same originated at the local node and has traversed the loop. In one such proposed check and forward system, information was to be sent in individual packets eighteen bits in length including a total destination label size of eight bits, a data field of eight bits and start/stop bits.

SUMMARY OF THE INVENTION

Accordingly, an important object of the present invention is to provide a closed loop communication system including a series of nodes each of which may communicate with the others on a flexible basis without the requirement of a permanent network controller and without the use of the check and forward principle.

In accordance with an important feature of the invention, a particular method for effecting communication in such a closed loop communication path has been developed wherein data messages are propagated about the loop path without processing delays at the respective nodes and without restriction on the length of a given data message.

A further object of the invention is to provide a closed loop communication system and method which is extremely simple and economical and highly flexible in its adaptability to the needs of relatively small enterprises, for example individual restaurants, and which system can very readily be expanded as needed with minimal cost and downtime.

In accordance with a method aspect of the present invention the nodes of a closed loop communication path initiate communication with other nodes by monitoring the closed loop communication path for a gap in communication along the closed loop communication path of a defined time span. Upon detection of such a communication gap, a node desiring to initiate communication, termed a bidding node, interrupts the loop by means of a transmission link switch at the bidding node, and transmits a bid message about the loop. The nonbidding nodes upon receipt of the bid message respond by insuring that their transmission link switches are closed. The bidding node monitors the closed loop communication path for the bid message (which will traverse the loop and arrive at the bidding node if the transmission link switches of the other nodes along the loop are in the closed condition). Upon a successful bid at a bidding node, a data message may be transmitted via the closed loop communication path while the transmission link switch at the bidding node is in the loop interrupting condition. At a recipient node upon receipt of the data message, the transmission link switch is placed in the loop interrupting mode, and a response is transmitted via the closed loop communication path. At the bidding node the transmission link switch is switched to the closed transmission condition to assure against a communication gap and then is placed in the loop interrupting mode. With such a method, decentralized control can be effected without requiring a common timing reference for the nodes of a closed loop communication path.

In accordance with an aspect of the apparatus invention, a series of nodes of a closed loop data processing network have communication links for enabling data communication about the loop path which is undelayed rather than requiring a processing step at each node. Means is associated with each data processing unit for placing an associated transmission link switch in a loop interrupting or cutoff mode during transmission of a data message from the data processing unit. Said means controls the transmission link switch to avoid introducing a communications gap of a predetermined time duration during reception of a response to the transmitted data message. In this way the response can circulate about the closed loop and prevent an undesired communications gap from being perceived at other nodes which may desire to transmit messages. This feature makes possible a decentralized closed loop communications network for data communication wherein the data processing units at the nodes operate autonomously without requiring a supervisory control such as a common timing reference.

A highly significant concept leading to successful operation of a closed loop data communication system as described herein was that of a control system embedded at the respective decentralized nodes such that one of the transmission link switches about the loop is maintained in cutoff mode at all times to insure that data messages do not repeatedly traverse the loop communications path. In a specific implementation of this concept, a bidding node seeking to initiate a data message and a recipient node transmitting a response coordinate the condition of their transmission link switches such that the bidding node prevents repeated circulation of a bid message or a data message originating therefrom while a recipient node prevents repeated circulation of its response message.

Other objects, features and advantages will be apparent from this detailed disclosure and from the appended claims.

DETAILED DESCRIPTION

Figure 1:
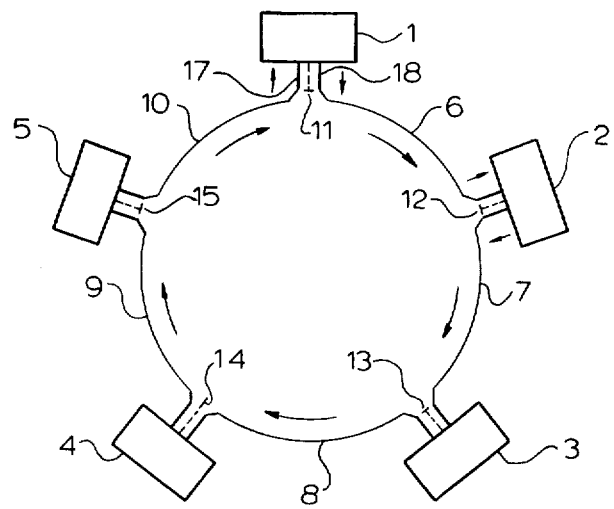
FIG. 1 is a diagrammatic view illustrating a ring type local computer network implemented in accordance with the system and method of the present invention.

FIG. 1 illustrates a ring type computer network comprising a series of nodes or stations 1 through 5. A loop communication path is provided by successive transmission links 6 through 10 and successive transmission link switches 11 through 15. The switches 11 through 15, in the illustrated embodiment, have a first mode wherein the associated incoming and outgoing transmission links are directly connected for the transmission of data without appreciable time delay, and have a second mode (indicated diagrammatically for switch 14) wherein the transmission link switch prevents a direct transmission of signal pulses from the incoming transmission link to the outgoing transmission link.

Each transmission link switch in FIG. 1 is diagrammatically indicated as having an incoming signal branching means for directing incoming signal pulses both to the transmission link switch path and also to an incoming signal receiving path such as 17. Similarly an outgoing signal junction is indicated for transmitting signal pulses to the outgoing transmission link either from the transmission link switch (when the transmission link switch is in its first transmitting mode) or from an outgoing signal sending path 18.

Considering a given station such as that at 1 in FIG. 1, if one of the other nodes (e.g. node 4) transmits a signal pulse, the pulse travels along the loop communication path via transmission links such as 9 and 10. If the transmission link switch 11 at node 1 is in the first transmitting mode, the signal pulse will be directly coupled to the outgoing transmission link 6 and for example may be again received at the sending node (e.g. node 4) after a time interval essentially dependent on the transmission velocity of the transmission links 6 through 10 and of the switches 11 through 15. As illustrated in FIG. 1, a sending node such as node 4 is to have its transmission link switch 14 in the second nontransmitting mode, so that the signal pulse traverses the loop path only once.

In a system in accordance with the present invention, each node may be provided with pulse amplification. Such pulse amplification may be provided at each transmission link switch path. Where the transmission links such as 6 through 10 are implemented as fiber optic transmission lines, it is convenient in the present state of the art to convert incoming light pulses into electronic form for amplification. In this case the transmission link switches such as 11 through 15 may be in the form of electronic switches interposed in series with electronic pulse amplification circuitry.

Figure 2:
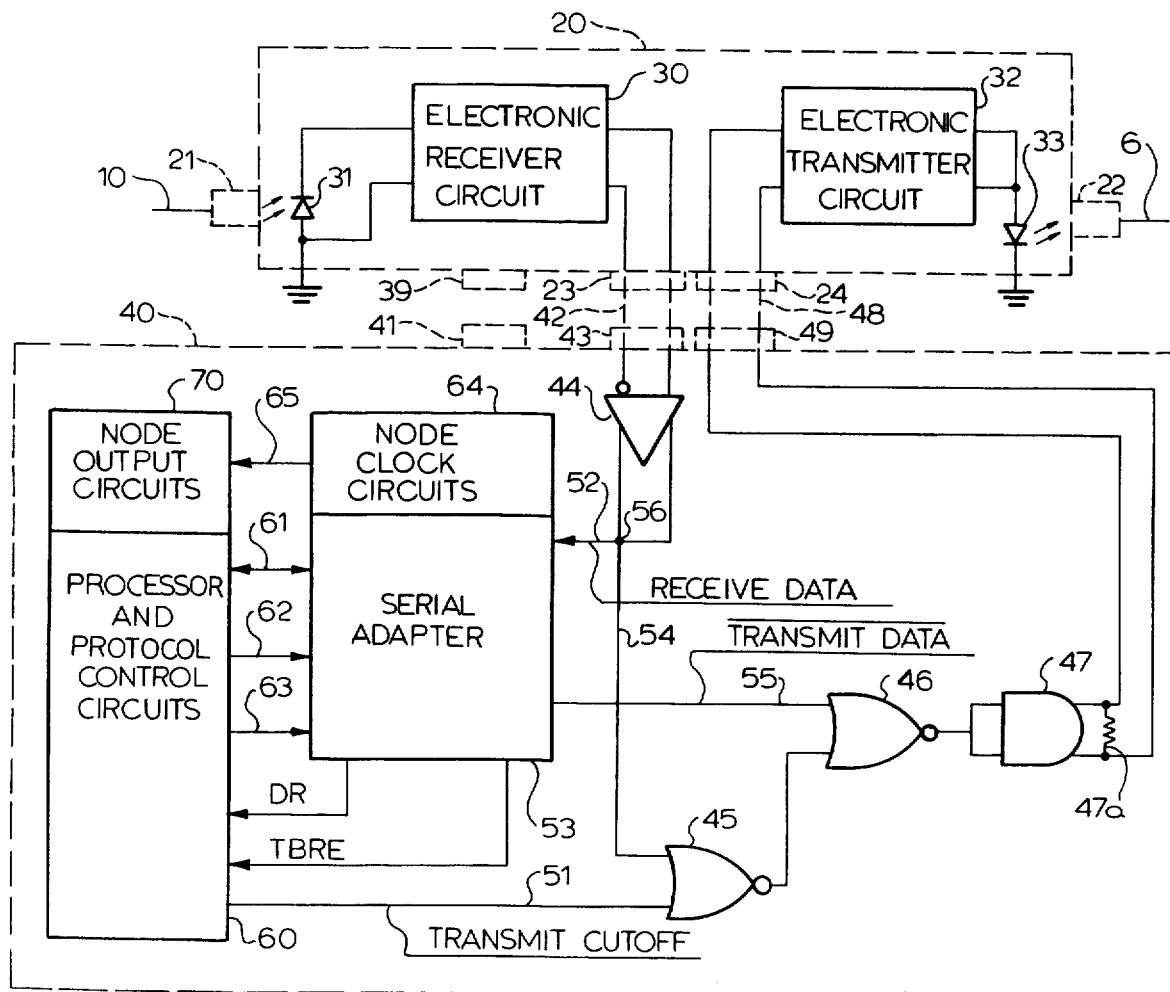
FIG. 2 is an electric circuit diagram illustrating a specific implementation of a transmission link switch for the nodes of a ring type computer network such as shown in FIG. 1 and indicating pulse amplification inserted in series with the transmission link switch, and node circuits for receiving and transmitting data and for controlling the transmission link switch.

For such a system it is advantageous to provide a standardized fiber optic interface module such as indicated at 20, FIG. 2, having a standard fitting 21 for receiving an incoming fiber optic transmission line and having a standard fitting 22 for connection with an outgoing fiber optic transmission line. Further standard electric cable fittings are indicated at 23 and 24 for providing an electric signal output and an electric signal input for the fiber optic interface module. The interface 20 may comprise an electronic receiver circuit 30 associated with an optical detector 31 and an electronic transmitter circuit 32 for driving an optical emitter 33.

The electronic receiver circuit 30 may be of a standardized design suitable for driving any of the various types of node circuitry such as indicated at 40. Further, the circuits 30 and 32 together may provide an optimum degree of amplification such that when cable fittings 23 and 24 are directly connected by means of a jumper cable, interface module 20 may serve as a simple repeater. In the event that module 20 does not include its own power supply, a further connector means may be provided as indicated at 39 which may be coupled to cooperating means 41 of node circuitry 40 so that power may be supplied to the interface module 20 from node circuitry 40. If node circuitry 40 is to be disconnected from module 20, e.g. because of a malfunction, a separate power supply module (not shown) may be connected at 39 to provide for operation of the interface module 20 independently of the node circuitry 40.

In general, a ring network such as shown in FIG. 1 may have fiber optic links such as 6 through 10 of a maximum length compatible with the amplification provided by components 30 and 32 of a standard interface module such as 20. Thus if node circuits 1 through 5, FIG. 1, comprise actual working computer circuits such as microprocessor units, electronic display units (e.g. cathode ray tube displays), keyboards, printers, and the like), the fiber optic links may each consist of a single continuous fiber optic strand without any amplification. A passive jumper cable between fittings 23 and 24 would then be used only to bypass the working node circuitry such as 40 in the event of a malfunction or the like.

A basic aspect of the system of FIG. 1 resides in the provision of a decentralized network where in principle any of the working node circuits 1 through 5 may be bypassed (e.g. at 23, 24, FIG. 2) without detriment to communication among the remaining nodes. Furthermore the transmission of data via an interface module is not subject to a processing (clock cycle) delay when the associated transmission link switch is in its first transmission mode (or is bypassed because of a malfunction). In particular, where electronic node circuitry, such as 40, FIG. 2, requires a given clock cycle time for executing a processing step, the signals being sent along the loop circuit such as shown in FIG. 1 traverse the node circuitry at an electronic transmission speed which is independent of the duration of such a clock cycle or processing interval and is dependent only on the actual response times of the circuits disposed in the transmission link switch path. Referring to FIG. 2, the switch path may include optical detector 31, receiver circuit 30, a cable 42 between fittings 23 and 43, pulse amplifier 44, NOR circuits 45, 46, pulse amplifier 47, a cable 48 between fittings 49 and 24, transmitter circuit 32 and optical emitter 33. In the particular exemplary embodiment of FIG. 2, which is based on commercially available components at the time of development, each of the transmission link switches such as 11 through 15 in FIG. 1 is implemented by means of a TTL (transistor transistor logic) integrated circuit module, and in particular by the NOR gate 45. An input line 51 of gate 45 is held at a logical zero potential to maintain switch 45 in its first pulse transmitting mode. To shift the switch 45 to its second nontransmitting mode, line 51 is shifted to a logical one "Transmit Cutoff" condition.

In FIG. 2, an electronic branching point 56 is provided at the output of electronic amplifier 44 so that incoming signal pulses can be supplied via a line 52 to a serial adapter component 53 as well as being supplied to the transmission link switch 45 via its second input 54.

When the node circuitry 40 has placed switch 45 in its second transmission cutoff mode, the serial adapter component 53 may effect a data transmission along the loop transmission path (FIG. 1) by supplying electronic pulses to an input line 55 of the NOR gate 46. Gate 46 thus provides a junction for coupling locally generated signal pulses onto the outgoing path leading from the transmission link switch (NOR gate 45) to the outgoing transmission link. Thus the incoming signal branching means which is indicated diagrammatically in FIG. 1 may be comprised of an electronic junction point as indicated at 56, FIG. 2. The "Receive Data" path 52 in FIG. 2 corresponds with the incoming signal branch path 17 indicated in FIG. 1. Similarly the "Transmit Data" line 55 in FIG. 2 corresponds to the outgoing signal sending path 18 indicated in FIG. 1.

For the particular node circuitry shown in FIG. 2, data is received as a time sequence of pulses on a single input channel 52. The pulses may represent successive hexadecimal characters and may be accumulated in a serial to parallel input register of component 53. For example, a given station of FIG. 1 may transmit a two character bid code followed by an address code representing the transmitting or bidding station or device. If the input register of component 53, FIG. 2, has received such a two character bid code, it can be transferred in parallel to a component 60 for processing, via a multiconductor data path indicated at 61. Such a transfer can be initiated by applying a momentary logical one signal to a read line 62. Similarly data from component 60 to be transmitted may be transferred in parallel via data path 61 to an output register of component 53 in response to a momentary logical one signal to a write line 63. Such data can then be output serially at a clock rate of an associated clock circuit 64 via transmit data line 55. Line 65 may connect a clock rate signal and the inverse of the clock rate signal with components 60 and 70. Component 70 may be a printer control circuit, for example. Data may be transmitted from component 60 to component 70 via a multiconductor path (not shown) and logical control signals may be supplied from component 60 to component 70 for effecting a desired output operation, with suitable acknowledgement and status signals being supplied from component 70 to component 60 in a conventional manner.

Component 60 may be implemented, for example, as a type 8748 integrated circuit, commercial sources for this microcomputer with erasable programmable read only memory being given in IC MASTER for 1981, page 555, lines 100 et seq.

Figure 3:
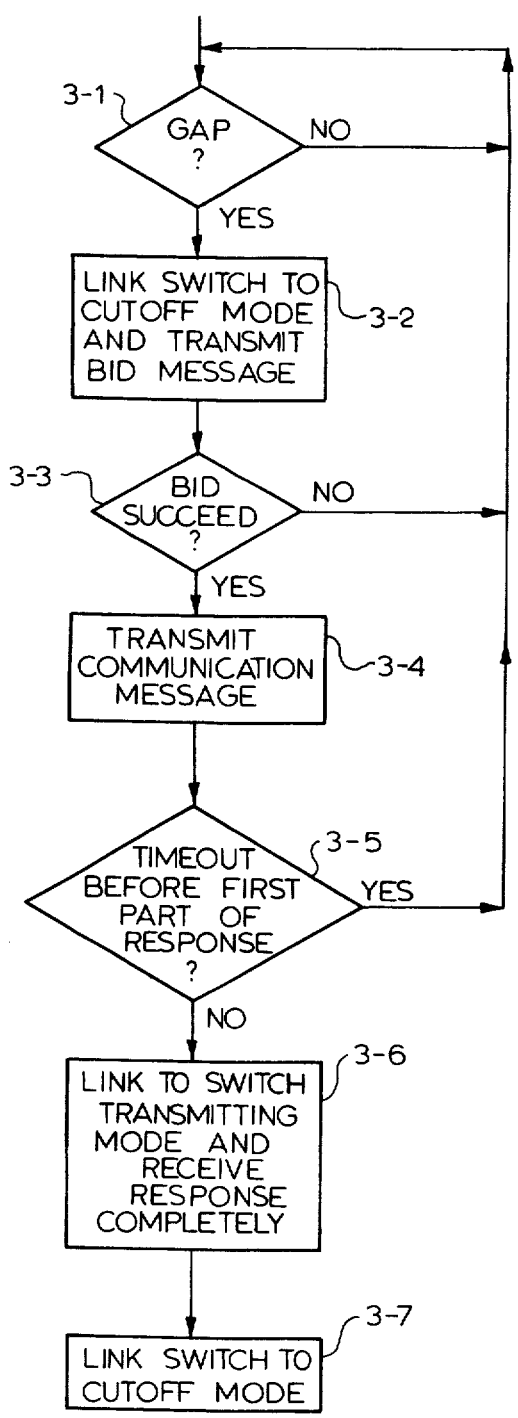
FIGS. 3 and 4 comprise flow diagrams for explaining the system and method in accordance with the present invention.
Figure 4:
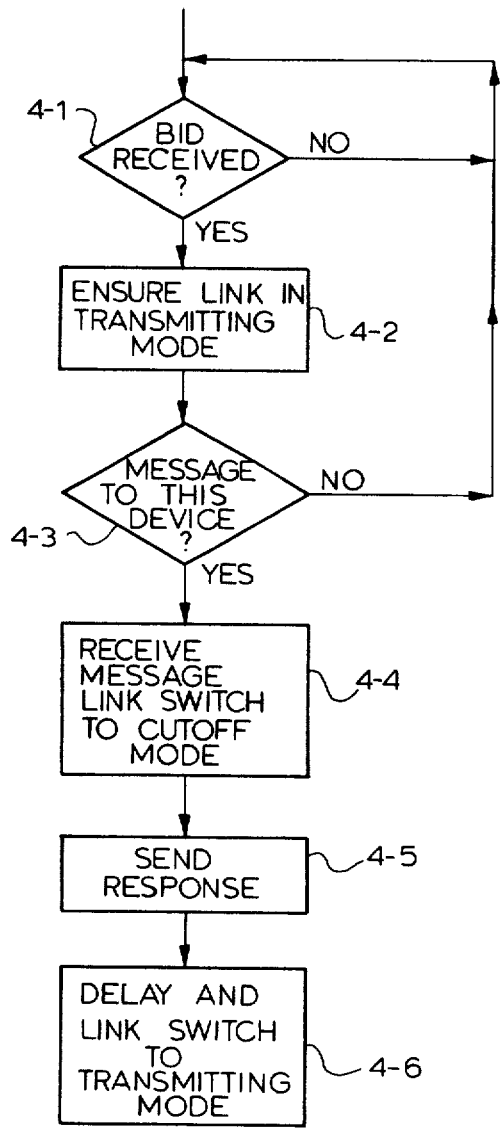

A further understanding of the system of FIGS. 1 and 2 and its operation may be had by reference to the flow diagrams of FIGS. 3 and 4. Reference numerals referring to these figures have an initial number corresponding to the figure number followed by a hyphen and a further digit or digits.

FIG. 3 is a simplified flow diagram for explaining operation at a node where a device is ready to transmit a data message. Such a node may have circuitry as shown in FIG. 2. FIG. 2 will be referred to in describing both sending and receiving nodes since it will be apparent when similar parts of two different nodes are intended. The sending node monitors its serial adapter 53 for the presence of data on the loop communication path. For example, component 60 may respond to each "Data Ready" signal supplied via line DR. In this case, the absence of a logical one signal at line DR for a predetermined time interval would indicate the existence of a communications gap. For example if the input register has eight stages, and if data is supplied to the input register at 125 kilobits per second, a data ready signal could occur after 64 microseconds. For the case of a printer station ready to transmit data, the microprocessor of component 60 can simply check for a Data Ready logical one condition on line DR at intervals of ten microseconds. The program can be such that if the Data Ready line DR remains at a logical zero condition during each of about ninety-eight monitor intervals, corresponding to a communications gap of about one millisecond, an affirmative decision is reached at the decision block 3-1. Decision block 3-1 can be implemented as a register which is initially set to a count value of ninety-eight and which is decremented each time the Data Ready line is found to be at the logical zero level and inspected for a zero count value representing the affirmative decision. If the Data Ready line DR is found to be at a logical one level, the register is reset to ninety-eight and a negative decision is reached as represented by the return path leading from the right hand corner of block 3-1.

Where the communications gap is detected, the microcomputer of component 60 proceeds as represented by step 3-2. In this event, a logical one is placed on the associated Transmit Cutoff line 51 to shift the transmission link switch 45 to its second transmission cutoff mode. At this point, having opened the direct loop path of FIG. 1, e.g. at transmission link switch 14, the microprocessor of component 60 checks for another communications gap of about one millisecond (e.g. a count of ninety) as an allowance for mistiming. If this second gap is also found to be present, then a bid message is loaded into an output register of the serial adapter 53 and transmitted to the Transmit Data line 55 at the transmission rate desired for the loop communication path of FIG. 1. The bid message may include a first two hexadecimal characters, e.g. 55 (hexadecimal), followed by two hexadecimal characters representing the address of the bidding (originating) station (e.g. a number between one hundred and twenty-eight and two hundred and fifty-five). Where data channel 61 and/or the output register of component 53 has a capacity less than that required for a given message length, it will be understood that suitable portions (e.g. successive eight bit bytes) of the complete message may be transferred via an output buffer register to the output register in successive operating cycles. Thus if eight bits at a time are loaded via path 61, a first eight bits may be transmitted in a burst with a duration of sixty-four microseconds after which a second eight bit portion of the message is loaded into the output register and sent. Alternatively, the component 60 may be operated at a higher clock rate, e.g. six megahertz, and may load a complete message into a sixteen bit output register, eight bits at a time, whereupon the complete sixteen bit message is sent over a desired transmission interval.

For a specific serial adapter 53 (e.g. a type IM 6402-1 Universal Asynchronous Receiver-Transmitter), each eight bit byte of data may be sent as part of a character group comprising: one start bit, eight data bits, one parity bit and one stop bit, a total of eleven bits. With the system and method herein disclosed, a message may be of any desired length. For example with an eight-bit HASH character representing the sum of bytes starting with a one-byte local address, and a one-byte status, the data part of the message could contain over 250 bytes.

Once the bid message has been transmitted, the bidding station monitors its serial adapter 53 to determine if its bid message has completely traversed the loop communication path. If this is the case, the bid message will be received at the input register of the serial adapter 53 of the bidding station (e.g. node 4) signifying a successful bid as represented by block 3-3, FIG. 3. For the case where two hexadecimal characters at a time are transferred via the data link 61 from an input buffer register associated with the input register of serial adapter 53, the program may provide that upon receipt of the characters 55 (hexadecimal), the program awaits arrival of the next two characters and compares the received address with the address of the bidding station. If the address is equal to that of the bidding station, the program proceeds to block 3-4 as represented in FIG. 3. It will be understood that block 3-4 is executed without allowing the occurrence of a communications gap (of about one millisecond) at any of the other nodes, and that the other nodes are so programmed that the node link transmission switches will all remain in the first transmitting mode in the absence of the necessary communications gap. It will be understood that each block of data as transmitted will be received at each of the other nodes and should also traverse the loop and arrive at the input register of the sending station.

A response to the message sent by the successful bidder (e.g. node 4) is required. If this is an initial transmission from the bidder, then the response can be data (e.g. to be printed). It can also be a Message Accepted signal (ACK), Message in Error, Retry (NAK), Message Accepted and Acted Upon (DEND), or Message Cannot Be Accepted by Addressed Device At This Time (BUSY). As indicated at block 3-5, the bidder waits for a response for a suitable time interval, e.g. about one millisecond. If the first part of a response is received before the interval elapses, then the transmission link switch at the bidding station (e.g. switch 14, FIG. 1) is placed in its first transmitting mode as represented by block 3-6. This prevents a communication gap from being observed at stations beyond the original bidding station, e.g. stations no. 5 and no. 1, if station no. 2 was being addressed and is responding. The original bidding station can now receive and process any remaining part of the response (e.g. from station no. 2).

The original bidding station must again shift its transmission link switch (e.g. 14) to the second transmission cutoff mode as represented by block 3-7.

FIG. 4 indicates in a simplified flow diagram the operation of a receiving station in responding to the transmission of a communications message (sent as outlined in FIG. 3). When a receiving station receives a bid message, the first part of the message is symbolized as CLOSEL (close link) and is the number 55 (hexadecimal). The second part of the message is the address of the bidding node. When a bid is recognized as represented by block 4-1, the first step at the receiving station is to ensure that the transmission link switch (e.g. switch 12 of node no. 2) is in the first transmitting mode as shown by step 4-2.

The message transmitted by the bidding station may have the following component parts: a Start Character, (STCHR, e.g. 5E, hexadecimal); an Address of the Device to Receive Data, (TOADDR): the bidding device address, (ADDR); a Command (COM) to the Device Receiving the Message or the Status (STATUS) of the Bidding Device Which is Responding to a Command; Optional Data Intended for the Receiving Device (DATA); a Longitudinal Redundancy Check (LRC); and a Byte Sum of All Bytes Starting with ADDR through DATA, (HASH).

The message may include the TOADDR part twice so that if there is a discrepancy between the two receiving values for TOADDR, the message is ignored.

The receiving nodes each compare the TOADDR value with the address assigned to its device. If the received message is addressed to its device, as determined at block 4-3, then the DATA, LRC and HASH parts are read as represented at block 4-4. If the DATA part conforms with the LRC and HASH parts, the DATA is considered to be acceptable. In any event the addressed device must respond in less than one millisecond. A response message may take the format given above, or it may include the following parts: Start Character, STCHR (5E hexadecimal), and a response character, RCHR, sent twice. The response character may be ACK (78 hexadecimal), NAK (19 hexadecimal), DEND (same code as CLOSEL), or BUSY (2C hexadecimal).

In general the station receiving a message will first place its transmission link switch (e.g. switch 12 for node no. 2) in the second cutoff mode. Then the one of the response messages is sent as represented at block 4-5. Having sent the response, the responding station executes a time delay so as to allow for transmission propagation about the loop (so that the response only can traverse the loop once), and having blocked a second traverse of the loop, the transmission link switch (e.g. switch 12 of node 2) is placed in its first transmitting mode.

Outline of Successful System Operation

In an actual system which has been successfully operated, provision is made for resolving conflicts where several nodes issue bid messages simultaneously. A more detailed outline of programming under these circumstances is as follows, with most of the steps of the outline being assigned sequential numbers for convenience of cross reference.

GAPREC—step one

This is an entry point at a one-millisecond gap for checking for input data. The sequence of steps following this entry point is entered after a communications gap is recognized pursuant to decision block 3-1 of FIG. 3.

SNDREQ?—step two

If the device has data to send (Send Request is set), then the bidding/sending routine is executed beginning at step eleven of this outline, and which corresponds to the sequence beginning at block 3-2 in FIG. 3.

FIRST CHAR.=CLOSEL?—step three

If the device is to receive data, the first character received must be the close link request character CLOSEL. See the discussion of block 4-1, FIG. 4, and compare step thirteen et seq. of this outline. A bidding station which is unsuccessful is branched to this step three from step fifteen of this outline.

If the first received character is not CLOSEL, then the program may return to a MAIN CODE routine not relevant to the present disclosure.

CLOSE LINK—step four

Make sure the link switch is in transmitting (closed) mode at this device. If the link switch was in cutoff (open) mode at this device, the bidding device will retry thus getting through.

READ NEXT CHAR—step five
START CHAR?—step six

Wait for bidding to finish, returning from step six to step five until a Start Character STCHR is received.

MESSAGE TO THIS DEVICE?—step seven

The "to" address in the message indicates whether the data is directed to the local device. The "to" address is sent twice and both address values must be the same before acceptance.

If the message is not to this device, the program may return to a MAIN CODE routine not relevant to the present disclosure.

RECEIVE DATA—step eight

See the discussion concerning block 4-4, FIG. 4.

DATA OK?—step nine, part A
OPEN LINK, NAK, DELAY (later inserted), CLOSE LINK—step nine, part B In part A of step nine, the processor of component 60 may compute the LRC and HASH values for the received data, and compare the computed values with the received values for LRC and HASH. If the computed and received values do not match, then a NAK response is transmitted to indicate that the received data is defective. As explained hereafter in reference to step seventeen of this outline, a master device may count NAK responses to a message, and reset its Send Request register after a predetermined number of failures. For minor devices, attempts to send the data may continue indefinitely. Where the sending device is to retry sending the message, another communications gap will occur before the message may again be received. Thus if the received data is defective, the program branches from part A to part B of step nine, and then after execution of part B returns to a MAIN CODE routine not relevant to the present disclosure.

The DELAY procedure of part B of step nine was later inserted as explained in connection with step nineteen hereafter.

RESPOND—step ten

If the received data is good, an appropriate response is sent. See block 4-5, FIG. 4.

SEND (Bidding/Sending Routine)

As stated under step two above, if the device has data to send, then a branching takes place after step two to a bidding/sending routine. The entry point for this routine is designated "SEND". The steps of the SEND routine are designated eleven through 18, and are outlined as follows:

OPEN LINK—step eleven

Since the device needs to originate a message, it must cut off the direct loop path (otherwise oscillation will occur in the ring network because of the progressive amplification at the successive nodes during each traverse of the loop path).

GAPSND?—step twelve

In this step, the prospective sending station monitors the communication loop for another millisecond communication gap before transmission is allowed.

If data is received during the gap timing interval, the program branches to step three above.

SEND BID—step thirteen

In this step a bid for link control is made, the step thus corresponding to a portion of block 3-2, FIG. 3. The bid message comprises the close link request character (CLOSEL) and the sending device address (ADDR). The close link request character requests the previous link controller (e.g. the previous successful bidder prior to the communications gap) to shift its link switch to the transmitting (closed) condition. The address which forms part of the bid message enables the resolution of simultaneous bids by allowing the bidding device with the lowest address to rebid, while forcing devices with higher addresses to drop out of the bidding.

CLOSEL CHAR RECEIVED?—step fourteen

If the bidding device awaits for a predetermined time interval without receiving a communication, or if a close link request character is not received, the program branches to the MAIN CODE routine, and the bid is retried after detection of a further communications gap.

ADDR: DEVICE'S ADDR?—step fifteen, part A
WAIT 100 MICROSECONDS—step fifteen, part B If a bid message has been received, the address part ADDR as received is compared with the local device address. If the address values are the same, there is no bidding conflict and the local device proceeds to send its data. See block 3-4, FIG. 3, and steps twenty-four et seq of this Outline.

If the received address part is lower than the local address, the local device has lost the bidding. Thus the program branches to step three above.

If the received address is higher than the address of the local device, the local device executes part B of step fifteen so as to allow time for losing bidders to follow steps three and four above. This prevents an unsuccessful bidding station from cutting off a first portion of a new bid message.

If the local device has the lower address, it rebids after part B of step fifteen, by returning to step thirteen above. In this way, contention can continue until all link switches except that of the bidder with the lowest address have been placed in transmitting (closed) condition. With a situation such as shown in FIG. 1 with only one link switch cutoff, a bid message from the associated device, e.g. at node 4, will be transmitted about the loop (via link switches 15, 11, 12, and 13) and be received at the bidding device. Thus the address in the received bid message will correspond to the local address. See block 3-3, FIG. 3.

SEND DATA—step sixteen

Send data and await a response. The details of this SEND DATA routine begin at step twenty-four of this outline.

SEND FAIL?—part A of step seventeen p0 >255 RETRIES?—part B of step seventeen

If the data transmission has failed (see part B of step twenty-seven), the program branches from part A to part B of step seventeen. The number of retries is incremented after each failure, and if the number of retries is not greater than 255, the program returns to the MAIN CODE routine without resetting the Send Request register (SNDREQ). It is then necessary to wait for a communications gap before executing a retry. If transmission has failed more than 255 times, the Send Request is reset before returning to MAIN CODE. See step eighteen which follows part B in this case.

RESET SNDREQ—step eighteen

If transmission is successful as determined in part A of step seventeen then the resetting of SNDREQ signals completion of data transmission, and the program returns to the MAIN CODE routine.

RESPOND

When a receiving station determines that received data is good (e.g. as a result of part A of step nine above), then a response is to be sent as represented at block 4-5, FIG. 4. This routine is outlined in the following which includes steps nineteen through twenty-three.

IMMEDIATE EXEC?—part A of step nineteen
OPEN LINE, ACK, DELAY (later inserted), CLOSE LINK—part B of step nineteen When data has been received, the receiving station may determine that an acknowledgement (ACK) is all the response that is required; in this case, the program branches from part A to part B of step nineteen. Also where no response can be made, the local device will send the ACK message as indicated by part B. On the other hand, if the response can be made immediately, the program progresses to step twenty.

The DELAY procedure of part B of step nineteen, and the corresponding delays in part B of step nine and in part B of step twenty were later inserted, and may have a duration of 200 microseconds. These inserted time delays insure that the sending station will have received the respective response and shifted its link switch to cutoff mode. See step 3-6, FIG. 3, and the "OPEN LINK" step following step twenty-eight in this Outline.

DATA TO SEND—part A of step twenty
OPEN LINK, DEND, DELAY (later inserted), CLOSE LINK—part B of step twenty In part A of this step, the processor determines whether the response requires the transmission of data. If not, the program branches to part B of step twenty and transmits an indication of command acceptance (DEND). The DEND transmission indicates an end of communication.

SEND DATA—step twenty-one

This routine begins at step twenty-four of this outline and corresponds to block 4-5, FIG. 4.

DELAY, CLOSE LINK—(later developed steps)

These steps follow step twenty-one and correspond to block 4-6, FIG. 4. A delay of 200 microseconds provides time for data to be transmitted through the buffers of the serial adapter such as 53 of the responding station, and time for the bidding station to shift its link switch to cutoff mode. The time delay also accommodates any time lags in the repeater circuitry intervening between the responding device and the bidding device. Thus, before the responding station has shifted its link switch (e.g. switch 12 at node 2) to its transmitting (closed) mode, the bidding station will have received the complete data message transmitted by the responding station (block 3-6, FIG. 3), and will have again shifted its link switch to cutoff (open) mode (block 3-7, FIG. 3). The objective is to maintain one of the link switches such as 11 through 15, FIG. 1, in cutoff mode at all times (while avoiding a communications gap at stations beyond the bidding station during the transmission of response data). Such concept of maintaining one link switch in cutoff mode at all times was considered crucial to successful operation of the actual system of the present Outline, this system being designated the A Line System. (The lack of a step number for these steps of the Outline indicates their later insertion to effect successful operation. Delays were also later inserted before shifting the link switch of the responding station to transmitting mode at part B of steps nine, nineteen and twenty.)

SEND FAIL?—step twenty-two

If the failure indication of part B of step twenty-seven has not been actuated, the response has been successfully transmitted, and the processor returns to the MAIN CODE. If the response failed to get through, processing progresses to step twenty-three which follows.

SET SNDREQ—step twenty-three

By setting the Send Request, SNDREQ, the processor is set up to retry sending the response upon detection of a communications gap of one millisecond.

After setting up to retry sending the response when a new communications gap is found, the program returns to the MAIN CODE routine.

SEND DATA

This routine is entered at steps sixteen and twenty-one of this outline, and is summarized in the following which includes steps twenty-four through twenty-eight.

OPEN LINK, SEND START CHAR, TOADDR, TOADDR, and DEVICE ADDR—step twenty-four

When a bidding station determines that the loop is complete at step fifteen, part A, the bidding station should have its link switch (e.g. 14, for node 4) in the cutoff (open) mode. To insure this, however, an Open Link command is transmitted by the processor of component 60 for making certain that line 51, FIG. 2, is at the logical one transmit cutoff potential. Transmission of the Start Character, STCHR, terminates bidding. The further parts of the message have been discussed in relation to block 3-4, FIG. 3. The address of the intended recipient, TOADDR, is sent twice as previously mentioned. Then the local device address, ADDR, is sent.

SEND REST OF DATA—step twenty-five

The bidding station, having won the bid, may send a command (COM) to the device addressed or may send the status (STATUS) of the local device in responding to a command from the device addressed.

SEND LRC, HASH—step twenty-six

LRC is defined as a longitudinal redundancy check, namely the exclusive OR bytewise of all bytes starting with ADDR, and including any command, COM, or STATUS response, and any optional data (DATA) for the receiving device.

HASH is defined as the byte sum of all bytes starting with ADDR through DATA.

This step has been modified to omit a final CLOSE LINK command, so as to insure that a responding station will have shifted its link switch to cutoff mode before the bidding station shifts its link switch (e.g. 14, FIG. 1) to the transmitting (closed) mode.

RESPONSE?—part A of step twenty-seven
INDICATE FAILURE—part B of step twenty-seven A response to the message of steps twenty-four, twenty-five and twenty-six is required, at least an acknowledgement, (ACK), or a Message in Error, Retry (NAK). If the message was an original transmission from the bidder, then the response can be a transmission of data. It can also be ACK, NAK, Device End (DEND), or BUSY. See the previous discussion in relation to block 3-5, FIG. 3, and in relation to block 4-4, FIG. 4. The DEND response indicates that the communication has been accepted and the command performed. No status report (STATUS) can be returned by the responding device. The BUSY response indicates that the responding device cannot handle the request at this time. A master station will automatically retry 255 times when a BUSY response is received. Minor devices will discontinue trying to send the message.

If there is no response within one millisecond, then communication failure is indicated, and the program proceeds from part A to part B of step twenty-seven. Having registered the failure, the processor proceeds to the OPEN LINK step following step twenty-eight.

CLOSE LINK (later inserted step)

Before the link switch of the sending station is placed in the transmitting (closed) mode, the sending station is to ensure that a receiving station has received the transmitted data and placed its link switch in cutoff (open) mode to transmit the response. Thus the sending station waits for the response as shown by step twenty-seven, part A, and only shifts the link switch to transmitting mode if a response is actually received.

If no response is received in part A of step twenty-seven within one millisecond, the link switch is not closed, the program branching from part B of step twenty-seven to the step following step twenty-eight of this outline.

NAK?—step twenty-eight

After closing the link switch, if the sending station determines that the response received was a NAK (message in Error, Retry), then the program returns to part B of step twenty-seven to indicate a communication failure, and then goes on to the OPEN LINK step which follows herebelow.

OPEN LINK (later inserted step)

If a response is received which is not a NAK, then when the complete response has been received, the sending station promptly shifts its link switch to the cutoff (open) mode before the responding station shifts its link switch to the transmitting (closed) mode (following a time delay). See block 3-7, FIG. 3.

If a failure in the transmission occurred resulting in a NAK, the link switch of the sending station will have been shifted to transmitting (closed) mode; accordingly the program branches from part B of step twenty-seven to the present "OPEN LINK" step.

Thus in any event at the end of the SEND DATA routine, the link switch of the sending station will be in the cutoff (open) mode.

If a responding station has data to send (part A of step twenty), it follows the routine of steps twenty-four et seq above, but then shifts its link switch to transmitting (closed) mode after a time delay of 200 microseconds, so that the sending station (the bidder) has time to shift its link to cutoff (open) mode after receiving the complete message.

In the system which has been successfully operated, exemplary components had the following implementation:

Fiber Optic Interface

Optical detector OD1 (31, FIG. 2)—type SD 4478.

Electronic Receiver (30, FIG. 2)—cascade connection six line receivers A1-1, A1-2, A1-3, A2-1, A2-2, and A2-3-type MC 10116. Input circuit of A1-1: pin 10 of A1-1 connected to upper terminal of grounded C12 (680 pF, 100 V) and to upper terminal of R11 (20 kilohms, 1%); pin 9 connected to upper terminal of R10 (20 kilohms, 1%) and to cathode of OD1; opposite terminals of C12 and OD1 to ground; opposite terminals of R10 and R11 to pin 11 of A1-1 and to upper terminal of grounded C8 (0.1 microfarad, 100 V), lower terminal of C8 to ground. Pin 7 of A1-1 to pin 5 of A1-2 and to grounded resistor R12 (200 ohms, 1%); pin 6 of A1-1 to pin 4 of A1-2 and to grounded resistor R13 (226 ohms, 1%); pin 3 of A1-2 to grounded resistor R14 (200 ohms, 1%) and to left terminal of C10 (0.001 microfarad, 100 V); right terminal of C10 to upper terminal of R16 (1 kilohm, 1%) and to pin 13 of A1-3; pin 2 of A1-2 to grounded R15 (200 ohm, 1%); pin 12 of A1-3 via one kilohm resistor (1%) to lower terminal of R16 and to pin 11 of A1-1; pin 15 of A1-3 to grounded R18 (301 ohm, 1%) and to left end of R20 (1K, 1%); right end of R20 to pin 10 of A2-1 and via R7 (10 kilohm, 1%) to pin 7 of A2-1; pin 14 of A1-3 to grounded R19 (301 ohms, 1%); pin 7 of A2-1 to R7, to grounded R6 (1 kilohm, 1%) and to pin 5 of A2-2; pin 9 of A2-1 to pin 6 of A2-1 via R8 (1 kilohm, 1%) and to pin 11 of A2-2 via R9 (1 kilohm, 1%); pin 6 of A2-1 to R8, to grounded R5 (1 kilohm, 1%) and to pin 4 of A2-2; pin 11 of A2-2 to R9 and to grounded C9 (0.1 microfarad, 100 V); pin 3 of A2-2 to grounded R4 (1 kilohm, 1%), and to pin 13 of A2-3; pin 2 of A2-2 to grounded R3 (1 kilohm, 1%) and to pin 12 of A2-3. Output circuit of A2-3: pin 15 to grounded R2 (1 kilohm, 1%) and to pin 3 of connector J2 (RRCV HI); pin 14 of A2-3 to grounded R1 (1 kilohm, 1%) and to pin 4 of connector J2 (RRCV LO).

Connector (23, FIG. 2): J2 pin 2-ground, J2 pin 3-RRCV HI, J2 pin 4-RRCV LO, J2 pin 5-ground.

Connector (30, FIG. 2): J1 pin 1-plus five volts (+5 VT, transmit), J1 pin 2-ground, J1 pin 5-ground, J1 pin 6-plus five volts (+5 VR, receive).

Power supply circuit: J1 pin 6 to plus terminals of grounded C5 (220 microfarads, 6.3 V) and grounded C6 (0.47 microfarad, 50 V) and to left terminal of L1 (56 microhenry; ground terminal (GND) to J1 pins 2 and 5, and to J2 pins 2 and 5; right terminal of L1 to grounded C7 (100 microfarads, 6.3 V), grounded C1 (0.1 microfarad, 100 V) and grounded C2 (0.1 microfarad, 100 V) and to +5 V output (C1 and C2 are decoupling capacitors for the integrated circuits packs A1 and A2).

Electronic Transmitter Circuit (32, FIG. 2): J1 pin 1 (+5 VT) to plus terminal of grounded C11 (220 microfarads, 6.3 V), and to pins 8 (VCC) and 5 (BCV EN) of A3 (Type 75117), and to upper terminals of R21 (68 ohms, 1 watt, 5%), and to plus terminals of C3 (0.1 microfarad, 100 V) and of C4 (0.1 microfarad, 100 V) and to +5 V output (C3 and C4 are decoupling capacitors for integrated circuit packs); A3 (type 75117) and A4 (type 75452); ground terminal (GND) o J1 pins 2 and 5, and to J2 pins 2 and 5, and to pin 1 (1N), pin 4 (GND) and pin 7 (D ENABLE) of A3; input (RXMIT HI) to J1 pin 3 and to pin 3 (A) of A3; input (RXMIT LO) to J1 pin 4 and to pin 2 (B) of A3; pin 6 (OUT) of A3 to pins 1, 2, 6 and 7 of A4 (type 75); pins 3 and 5 of A4 to lower terminal of R21 and to anode of optical emitter OE1 type SE 4352 (33, FIG. 2).

Optical emitter OE1 (33, FIG. 2)-type SE 4352-anode of OE1 to pins 3 and 5 of A4 and to R21; cathode of OE1 to ground.

Twenty-Six Column Printer Control

Connector (43, FIG. 2): J3 pin 3 (RRCV HI) to pin 5 of A42, type 75118 (44, FIG. 2): J3 pin 4 (RRCV LO) to pin 7 of A42 (44, FIG. 2).

Pulse amplifier (44, FIG.2)-A421 (type 75118): pin 5 to J3 pin 3; pin 7 to J3 pin 4; pin 8 to ground; pins 10 and 13 via R4 (10 kilohms) to +5 V; pins 11 and 12 (RECEIVE DATA) to pin 8 of A221-type 6502 (NOR gate 45, FIG. 2) and to pin 20 of A13-IM 6402-1 (Serial Adapter 53, FIG. 2); pin 16 to +5 V.

NOR gate A221-LS02 (45, FIG. 2): pin 8 to pins 11 and 12 of A 421 and to pin 20 of A13; pin 9 (TRANSMIT CUTOFF) to pin 38-P27 of A41-8748 EPROM (component 60, FIG. 2); pin 10 to pin 5 of A222-LS02 (46, FIG. 2).

NOR gate A222-6502 (46, FIG. 2): pin 5 to pin 10 of A221; pin 6 to pin 6 of A12-LS04 (Inverter 57, FIG. 2); pin 4 to pins 14 and 15 of A422 (pulse amplifier 47, FIG. 2).

Pulse amplifier A422-75118 (47, FIG. 2): pins 1 and 2 to lower terminal of R2-120 ohm (47a, FIG. 2) and to J4 pin 3 (RXMIT LO); pins 3 and 4 to upper terminal of R2 and to J4 pin 4 (RXMIT HI).

Connector (49, FIG. 2): J4 pin (RXMIT LO) to J1 pin 3; J4 pin 4 (RXMIT HI) to J1 pin 4.

Serial Adapter-A13, IM 6402-1, IOC, UARTα Socket (component 53, FIG. 2): pin 1 (VCC) to +5 V; pin 3 (GND) to ground; pin 5 (RBR8) and pin 33 (TBR8) to pin 19 (DB7) of A41, etc. to provide eight conductors of the multiconductor path (61, FIG. 2); pin 23 (TBR1) to pin 10 (WR) of A41 via write line (63, FIG. 2); pin 4 (RRD) and pin 18 (DRR) to pin 8 (RD) of A41; pin 40-2 MHZ (TRC) and pin 17-2 MHZ (RRC) to 2 MHZ output of node clock circuits (64, FIG. 2); pin 21 (MR) to RESET; pin 19 (DR) to pin 1 of A41 via data ready line (DR, FIG. 2); pin 22 (TBRE) to pin 39 of A41; pin 20 (RBI) to RECEIVE DATA line (52, FIG. 2); pin 25 (TRO) to pin 5 of A12-LS04; pin 39 (P5), pin 35 (PI), pin 36 (SBS), and pin 16 (SFO) to ground; pin 38 (WLS1), pin 37 (WLS2) and pin 34 (CRC) to +5 V.

Inverter A12-LS04; pin 5 to pin 25 of A13 (53, FIG. 2); pin 6 to pin 6 of A222-LS02 (46, FIG. 2).

Processor and Protocol Control Circuits-A41-type 8748 EPROM (60, FIG. 2): pin 4 ($\overline{\text{RESET}}$) to line $\overline{\text{RST}}$; pin 2 (XTAL 1) to 6 MHZ output of the node clock circuits (64, FIG. 2); pin 3 (XTAL 2) to 6 $\overline{\text{MHZ}}$ of the node clock circuits (64, FIG. 2); pin 33 (P16) to line $\overline{\text{TST}}$; pin 7 (EA) and pin 20 (VBS) to ground; pin 6 ($\overline{\text{INT}}$) to J1 pin 39 ($\overline{\text{COVER OPEN}}$); pin 32 (P15) to J1 pin 38 ($\overline{\text{LOW PAPER}}$); pin 26 (VDD) and pin 40 (VCC) to +5 V; pin 39 (T1) to Transmit Buffer Empty line (TBRE, FIG. 2); pin 1 (T∅) to Data Ready line (DR, FIG. 2); pin 38 (P27) to Transmit Cutoff line (51, FIG. 2); pin 37 (P26), pin 36 (P25), pin 35 (P24) to three high order bits of a node address selector switch (weights 64, 32 and 16); pin 24 (P23), pin 23 (P22), pin 22 (P21) and pin 21 (P20) to four low order bits of the node address selector switch (weights 8, 4, 2 and 1); pins 19, 18, 17, 16, 15, 14, 13 and 12 (DB7, DB6, DB5, DB4, DB3, DB2, DB1, DB∅) to eight lines of data path to A13 (data path 61, FIG. 2); pin 10 ($\overline{\text{WR}}$) to $\overline{\text{UART WR}}$ line (63, FIG. 2); pin 8 ($\overline{\text{RD}}$) to $\overline{\text{UART RD}}$ line (62, FIG. 2); pin 29 (P10) to output circuits (70, FIG. 2) via ACT line; pin 28 (P11), via RTS line; pin 29 (P12), via TD line; pin 30 (P13), to DTR line; pin 31 (P14) to $\overline{\text{BTS}}$ line, lines RTS, TD, DTR and $\overline{\text{BTS}}$ also leading to the output circuits (70, FIG. 2).

In the foregoing, the abbreviation "pf" refers to picofarads, the abbreviation "V" refers to volts, and the abbreviation "K" stands for kilohm.

Exemplary Loop Installation

In an exemplary layout according to FIG. 1, a first fiber optic interface FOIA has its output (like 22, FIG. 2) connected via a first fiber optic line L1 to a second fiber optic interface FOIB. The second fiber optic interface FOIB was connected via a second fiber optic line L2 to a third fiber optic interface FOIC which in turn was connected to the first fiber optic interface FOIA via a third fiber optic line L3.

A printer control (such as 40, FIG. 2) had its electrical input port (such as 43) connected to the electrical output port (such as 23, FIG. 2), but had its electrical output port (such as 49, FIG. 2) connected to the electrical input port of a keyboard display control. The electrical output port of the keyboard display control in turn was connected to the electrical input port (such as 24) of the first fiber optic interface FOIA.

Similarly, the second fiber optic interface FOIB has an electric path between its electrical output and input ports (like 23, 24, FIG. 2) including two master computers, and the third fiber optic interface FOIC couples into the overall loop a printer control and a cathode ray tube display. Thus there are two local stations which are locally interconnected by inexpensive electrical cables associated with each fiber optic interface. Either of the local stations can be bypassed by rearranging the local electrical cables. The local stations are linked by fiber optic lines so as to assure freedom from electrical and magnetic interference over the extended paths between local sites. In a restaurant environment and printer and the keyboard and display may be located at a cashier's station while the remaining components may be in management offices or the like.

For the sake of background information, a copy of a computer printout is shown on the following pages, with titles as follows:

(I) ALINE MASTER I/O INTERFACE V2.6
(II) ALINE CONSOLE CONTROLLER V2.1
(III) ALINE PRINTER CONTROLLER V2.0
(IV) ALINE CRT CONTROLLER V1.1

```
        TITLE   'ALINE MASTER I/O INTERFACE   V2.6
        LIST    Z
        NLIST   R
*       ALINE Z80 MAJOR USED WITH LINKLESS PROTOCOL.
*       AUTHOR          JOE KUBLER
*       WRITTEN         SEPT. 19,1979
*       MAY 29,1980     FIX INTERRUPTS
*
*       V2.0
*       V2.1            6/06/80.   ADD POWER UP RESET COMMAND AND BUSY RETRY LIMIT
*       V2.2            9/08/80    ADD WARM RESTART CAPABILITY
*       V2.3            11/13/80   ADD SVC2,CHANGE COLD AND WARM RESTART,
*                                  ADD NATIVE CODE IPL
*       V2.4            12/01/80   ADD RAM ADDRESSABILITY TEST. THIS TEST
*                                  WILL ALSO DO A RUDIMENTERY RAM TEST.
*       V2.5            3/20/81    CHANGE MEMORY ERROR CODE TO ALLOW EASY
*                                  TEST OF BOARDS. ALSO CHANGE MEMORY TEST
*                                  TO 'STATIC' TYPE TEST
*       V2.6            4/23/81    ADD TO POWER UP MESSAGE FOR DEBUGGER
*
*       DEFINES
*               LINKAGES TO INTERPRETER AND DEBUGGER
ZINT    EQU     1003H
ZBUGINT EQU     1000H
TESTIND EQU     3003H     INDICATOR TO MEMMORY ERROR CODE THAT TEST ROMS LOADED
TESTAD  EQU     3005H     ADDRESS OF TEST CODE
*
INDIC   EQU     55H       INDICATOR VALUE FOR RESTARTS ETC
FCLDT   EQU     2000H     ADDRESS OF DATA PATTERN TO CONFIRM NUL ROM
FCLDV   EQU     2002H     VECTOR OF FIRMWARE NULL CODE TO EXECUTE
FWRMI   EQU     2004H     ADDRESS OF POSSIBLE NUL WARM START CODE
FWRMV   EQU     2006H     VECTOR OF FIRMWARE NULL TO EXECUTE FOR WARM START
MERADR  EQU     81F8H     MEMORY ERROR ADDRESS SAVE LOCATION
MERV    EQU     MERADR+2  VECTOR OF NUL CODE FOR MEMORY ERROR HANDLER
SWRMI   EQU     MERV+2    ADDRESS OF DATA PATTERN TO CONFIRM RAM WARM START
SWRMV   EQU     SWRMI+2   VECTOR OF NUL CODE TO EXEC FOR RAM WARM START
*
DVRADR  EQU     7EH       ADDRESS INDICATING SENDING DEVICE POWERED UP
*
LNKCTL  EQU     0         LINK CONTROL
LINKST  EQU     0         LINK STATUS
LINK    EQU     1         LINK UART PORT
RESGAP  EQU     2         RESET GAP AFTER INTERRUPT
ALNADR  EQU     2         ALINE ADDRESS OF THIS DEVICE
NMISTA  EQU     0         NON-MASKABLE INT STATUS BYTE TO INDICATE WARMRESTART
MEMERC  EQU     3         TURN ON MEMORY ERROR LIGHT
MEALO   EQU     4         ADDRESS OF MEM ERROR LOW BYTE
MEAHI   EQU     5         MEMORY ERROR ADDRESS HIGH BYTE
WARMST  EQU     5         INDICATOR IN NMISTA OF WARM START VS MEMORY ERROR
WARMDB  EQU     1000      DEBOUNCE TIME FOR WARM RETART BUTTON
LNKIRD  EQU     8         LINK INPUT READY STATUS MASK
LNKORD  EQU     10H       LINK OUTPUT READY STATUS MASK
TIMODLY EQU     24        TIMEOUT 0 VALUE .4 MSEC
CHRDLY  EQU     7         TIMEOUT FOR 1 CHAR ON LINK .15 MSEC
MAXNAK  EQU     255       MAXIMUM NAKS ALLOWED FOR A MESSAGE
ACKCHR  EQU     78H       VALUE OF ACK CHAR IN PROTOCOL
NAKCHR  EQU     19H        "      "  NAK  "  "
ENDCHR  EQU     55H        "      "  END  "  "
BSYCHR  EQU     2CH        "      "  BUSY "  "
CLOSEL  EQU     55H       CLOSE LINK REQUEST CHAR
STCHR   EQU     5EH       START CHAR OF PROTOCOL
*       DEVICE SERVICE BLOCK DEFINES (DSB)
DSBSTA  EQU     0         DSB STATUS
```

```
DEVICE    EQU    1            DSB DEVICE
DSBCOM    EQU    2            DSB COMMAND
DEVSTA    EQU    3            DSB DEVICE STATUS OR COMMAND
OBDPTR    EQU    4            DSB OUTPUT BUFFER DESCRIPTOR POINTER
INBUFA    EQU    6            DSB INPUT BUFFER POINTER
INBUFL    EQU    8            DSB INPUT BUFFER LENGTH
INRECL    EQU    10           DSB INPUT RECORD LENGTH RECEIVED
INTADR    EQU    12           DSB INTERRUPT ADDRESS POINTER
DSBLNK    EQU    14           DSB LINKED LIST POINTER
DSBNAK    EQU    3            NAKS FOR RECEIVING IN DSB
*         BIT NAMES FOR BITS IN DSBSTA
DDEND     EQU    7            DEVICE END IN RDRES
DDONE     EQU    7            DSB COMMAND COMPLETED OR FAILED
DPI       EQU    6            DSB COMMAND SENT, AWAITING COMPLETION
DBUSY     EQU    5            BUSY RESPONSE FROM DEVICE
DBADD     EQU    4            CHECK CHARS FAILED IN LAST INPUT MESSAGE
DTIM      EQU    3            TIMEOUT1 OCCURED AFTER LAST TRANSMISSION
DNAK      EQU    2            NAK RECEIVED AFTER LAST MESSAGE
DPUP      EQU    1            DEVICE POWERED UP AFTER COMMAND
DACK      EQU    0            ACK RECEIVED AFTER LAST MESSAGE
*         BIT NAMES FOR BITS IN IOCTL (SEE MEMORY ALLOCATION)
TIMCHK    EQU    7            AT GAP INT. INDICATES TIMEOUT1
GAPCK     EQU    6            AT GAP INT. INDICATES A GAP IN PROTOCOL
UNKREC    EQU    5            INDICATES INPUT ON UNKNOWN DSB (DSBX LIST)
RECSET    EQU    4            AT FIRST CHAR INDICATES A PROTOCOL GAP HAS PASSED
BRKLNK    EQU    3            USED TO BREAK LINK
PEDLNK    EQU    2            SUB LINK
ERRLCK    EQU    1            MEMORY ERROR INTERRUPT LOCKOUT
FCHREN    EQU    0            ENABLE UART INT. INDICATING FIRST CHAR INT
*         MEMORY ALLOCATION
          ORG    8000H
DEVTAB    DS     256          ACTIVE DEVICE LIST
DSBX      DS     2            DSB POINTER FOR UNDEFINED INPUTS
IOCTL     DS     1            CONTROL OF GAP INT. AND LINK
SNDDSB    DS     2            ADDRESS OF NEXT DSB TO SEND OR CURRENT DSB THAT
                              ; RESPONSE IS DUE ON BY TIMEOUT1
*         NAKS,NXTDSB AND LSTDSB MUST BE IN THIS ORDER
NAKS      DS     1            ; USED TO KEEP TRACK OF NUMBER OF NAKS IN MESSAGE
NXTDSB    DS     2            ; POINTER TO NEXT DSB TO TRANSMIT
LSTDSB    DS     2            ; TAIL POINTER TO CURRENT LAST DSB TO TRANSMIT
NBLK      DS     1            ; NUMBER OF BLOCKS ON DISK (256 MAX = 65K PROG)
TEMP      DS     5            ; TEMPORARY USED IN VARIOUS PLACES
INTLSW    DS     1            ; NUL INTERRUPT STATUS BYTE
                              ; BIT 0 IS INTERRUPT PENDING
                              ; BIT 1 IS INTERRUPT ENABLE
INTHEAD   DS     2            ; HEAD POINTER FOR DSB INTERRUPT LIST
INTAIL    DS     2            ; TAIL POINTER FOR DSB INTERRUPT LIST
ERRINT    DS     1            INDICATOR FOR INTERRUPT THAT MEM ERR OCCURED
DATAPC    DEFL   8
STACK     EQU    MERADR
*
*
*         PROGRAM       CODE
*
CODEPC    DEFL   0
          ORG    CODEPC
          JP     START
          JP     SVCOIO       USED FOR EXTERNAL ROUTINES TO CALL SVC0
          DW     IOMESS
          ORG    8            GAP
          EX     AF,AF'
          OUT    (RESGAP),A   CLEAR GAP INT
          JP     GAPINT

ORG    8*2          BOTH GAP AND FIRST CHAR. TREAT AS GAP INT
          JP     18H
          JP     SVC2IO               ;ENTRY FOR SVC2
          ORG    8*3          GAP AGAIN
          EX     AF,AF'
          OUT    (RESGAP),A
          JP     GAPINT
          ORG    8*4          DATA READY
```

```
            EX      AF,AF'          SAVE REGS
            IN      A,(LINK)        CLEAR FIRST CHAR (CAN ALWAYS IGNORE THIS CHAR)
            EXX                     SAVE REST OF REGS
            JP      FCHR
            ORG     8*5             DIAGNOSTIC BOARD INTERRUPT
            JP      ZBUGINT
            ORG     8*6             DATA READY AGAIN
            EX      AF,AF'          SAVE REGS
            IN      A,(LINK)        CLEAR FIRST CHAR (CAN ALWAYS IGNORE THIS CHAR)
            EXX                     SAVE REST OF REGS
            JP      FCHR
            ORG     8*7
            EI
            RET
*           MEMORY ERROR NONMASKABLE INT.
            ORG     66H             MEMORY ERROR INTERRUPT
            PUSH    AF
            PUSH    HL
            LD      H,0
NMI0        IN      A,(NMISTA)      IS IT MEM ERROR OR RESTART
            BIT     WARMST,A
            JR      Z,NMIF          RESTART IS ZERO
            DEC     H
            JR      NZ,NMI0
            LD      HL,(TESTIND)    GO TO TEST ROM ?
            LD      A,TNDIC
            CP      H
            JR      NZ,NMNTEST
            CP      L
            JP      Z,TESTAD
NMNTEST     IN      A,(MEMERC)      TURN ON ERROR LIGHT
            IN      A,(MFALO)
            LD      L,A
            IN      A,(MFAHI)
            LD      H,A
            LD      A,(HL)
            LD      (HL),A          READ CORRECTED BIT AND WRITE IT BACK (SOFT ERROR
            LD      (MERADR),HL
            LD      HL,ERRINT
            SET     0,(HL)
NMIME       POP     HL
            POP     AF
            RETN
NMIF        LD      HL,SWRMI        RAM WARM RESTART ?
            LD      A,TNDIC
            CP      (HL)
            JP      NZ,NMI1
            INC     HL
            CP      (HL)
            JP      Z,WARMR         IT IS
NMI1        LD      HL,FWRMI        ROM WARM RESTART ?
            CP      (HL)
            JP      NZ,NMIME
            INC     HL
            CP      (HL)

JP      NZ,NMIME
WARMR       INC     HL
            LD      A,(HL)          GET ADDRESS FROM VECTOR
            INC     HL
            LD      L,(HL)          IN NUL ORDER
            LD      H,A
            LD      SP,STACK
            PUSH    HL              SAVE ADDRESS FOR RESTART
            POP     IX              NOW SAVE APPS START ADDRESS
WARM0       LD      BC,WARMDB       DEBOUNCE RESTART BUTTON
WARM1       IN      A,(NMISTA)
            BIT     WARMST,A
            JP      Z,WARM0
            DEC     BC
            LD      A,B
            OR      C
```

```
        JP      NZ,WARM1
        LD      HL,WARM2        GET OUT OF NMI MODE
        PUSH    HL
        RETN
WARM2   LD      BC,1F8H         ZERO DEVICE TAB AND OTHER IO AREAS
        LD      HL,DEVTAB
        LD      DE,DEVTAB+1
        LD      (HL),0
        LDIR
        LD      A,2**ERRLCK+2**BRKLNK    SET UP LINK CONTROL PORT
        LD      (IOCTL),A
        LD      (LNKCTL),A
        IN      A,(LTNK)        RESET UART INPUT
        CALL    POWRUP          SEND POWERUP MESSAGE
        EI
        PUSH    IX              SET UP APPS FOR INTERPRETER
        JP      ZINT
*
FCHR    LD      B,A             SAVE CHAR FOR TESTING FOR CLOSE LINK REQUEST
        PUSH    IX              SAVE INDEX REGISTER IX
        LD      A,(IOCTL)
        BIT     TIMCHK,A        WAITING FOR TIMEOUT SO THIS IS RESPONSE
        JP      NZ,RESPNS
        BIT     RECSEI,A        SEE IF CLOSEL COMMAND WAS RECEIVED SO DATA COMES
        LD      A,B             GET FIRST READ CHAR BACK FOR RESPONSE TEST
        JP      NZ,RECEIVE
        JP      RECCLSL         MESSAGE TO RECEIVE
WAITGAP LD      A,(IOCTL)       SET UP TO WAIT FOR NEXT GAP
        AND     2**BRKLNK+2**ERRLCK     LEAVE ERROR LOCKOUT AS IT WAS
WAITGPS LD      (IOCTL),A
        OUT     (LNKCTL),A
        EXX                     SWAP REG BANKS BACK
        EX      AF,AF'
        POP     IX
        EI
        RET
*       GAP INT
GAPINT
        LD      A,(IOCTL)
        BIT     RECSET,A        ARE WE WAITING FOR BIDDING TO END?
        JP      NZ,GAPEX
        BIT     TIMCHK,A        TIMEOUT1 OCCUR?
        JP      NZ,TIMOUT1
        BIT     GAPCK           PROTOCOL GAP?
        JP      NZ,GAP
        OR      2**GAPCK+2**FCHREN      NEXT GAP IS PROTOCOL GAP.
        LD      (IOCTL),A

OUT     (LNKCTL),A
        IN      A,(LTNK)                MAKE SURE ANY LEFTOVER CHAR IS CLEARED
GAPEX   EX      AF,AF'
        EI
        RET
GAP     EXX                     FINISH SWAPPING BANKS
        PUSH    IX              AND SAVE IX REG
        LD      B,A             SAVE IOCTL STATUS
        LD      HL,NAKS         SEE IF LAST DSB DONE OR IF THERE IS ANOTHER TO
        LD      A,(HL)
        INC     HL
        INC     HL
        OR      (HL)                    SEND (NXTDSB NOT NULL)
        JP      Z,INTRETE
        IN      A,(LINKST)      MAKE SURE NOONE SENT CHAR ALREADY
        AND     LNKIRD
        JP      NZ,BIDLST
        SET     BRKLNK,B        BREAK THE LINK TO BID
        LD      A,B
        OUT     (LNKCTL),A
        LD      (IOCTL),A
        IN      A,(LTNKST)      DID SOMEONE GET LINK BEFORE US?
        AND     LNKIRD
        JP      Z,BID
```

```
BIDLST  IN    A,(LINK)
        JP    RECBRK           TEST IF CHAR WAS CLOSE LINK CHAR
BID     LD    A,CLOSFL         REQUEST CURRENT LINK 'CONTROLLER' TO CLOSE
        CALL  PUTCHR
        IN    A,(ALNADR)       AND SEND BID TO MAKE SURE WE ARE ONLY SENDER
        LD    E,A
        CALL  PUTCHR
BID1    CALL  TIMEO
        JP    Z,WAITGAP        IF NO RESPONSE THEN LINK IS OPEN YET SO WAIT
        CP    CLOSFL           MAKE SURE CHAR IS A CLOSE CHAR
        JP    NZ,BID1
        CALL  TIMEO            SEE IF WE WON BID BUT DON'T WAIT FOREVER
        JP    Z,WAITGAP
        CP    E                WHAT ADDRESS CAME IN
        JP    M,RECCC          LOST BID . CLOSE LINK AND WAIT FOR START CHAR
        JP    Z,BID2           WON BID SO SEND DATA
        LD    B,16             DELAY BEFORE REBIDDING
        DJNZ  $
        JP    BID
BID2    LD    HL,NAKS          SEE IF NEW DSB TO SEND
        LD    A,(HL)
        OR    A
        JP    Z,BID3
        LD    IX,(SNDDSB)
        JP    BID4
BID3    LD    IX,(NXTDSB)      GET DSB TO SEND AND SAVE
        LD    (SNDDSB),IX
        LD    A,(IX+INRECL)    UPDATE TRANSMIT QUEUE
        DEC   (HL)             SET NAKS TO SEND CORRECT NUMBER OF TIMES
        INC   HL               POINT PAST 'NAKS' TO NXTDSB
        LD    (HL),A           SAVE UPDATED NXTDSB POINTER
        INC   HL
        LD    A,(IX+INRECL+1)
        LD    (HL),A
BID4    CALL  SENDM
        LD    A,(IOCTL)        SET IOCTL TO ALLOW TIMEOUT1 AND FCHR
        OR    2**TIMCHK
        OUT   (LNKCTL),A
        LD    (IOCTL),A

INTRETF POP   IX               RETURN FROM INT WITH FIRST CHAR INT ENABLED
        EXX
        EX    AF,AF'
        EI
        RET
*
TIMOUT1 EXX                    SAVE BANK
        PUSH  IX               AND INDEX
        LD    IX,(SNDDSB)      DSB THAT WAS TIMED OUT
        SET   DTIM,(IX+DSBSTA) INDICATE TIMEOUT IN DSB STATUS
        LD    HL,NAKS          BUMP NAK COUNT
        DEC   (HL)
        JP    NZ,EXITIO2       IF NOT RETRY MESSAGE/COMMAND
EXITIO  CALL  REMDSB           IF SO THEN FINISH I/O ON DSB
EXITIO1 LD    HL,NAKS          ZERO NAKS TO INDICATE DONE SENDING DSB
        LD    (HL),0
EXITIO2 LD    A,(IOCTL)
        AND   2**ERRLCK+2**BRKLNK  CLEAR ALL BITS EXCEPT ERROR LOCKOUT
        OR    2**FCHREN        NEXT CHAR IN SHOULD BE A BID. SO WE WAIT
                               ; FOR IT SO WE CAN CLOSE LINK (IN RECEIVE)
        JP    WAITGPS
*
*       RESPONSE COMING IN FROM COMMAND
RESPNS  LD    IX,(SNDDSB)
        LD    A,(IOCTL)        CLOSE LINK SO RESPONSE CAN GO AROUND
        RES   BRKLNK,A
        OUT   (LNKCTL),A
        LD    A,B              GET INPUT CHAR
        CALL  RDRES
        LD    A,(IOCTL)        OPEN LINK AGAIN
        OUT   (LNKCTL),A
        LD    A,D              GET RESPONSE STATUS
```

```
            OR      (IX+DSBSTA)          UPDATE TEMPORARY STATUS
            LD      (IX+DSBSTA),A
            BIT     DACK,D               ACK?
            JP      Z,RNAK
RESOK1      LD      A,(IX+INBUFL)        SEE IF THIS IS ALL THAT WAS EXPECTED
            OR      (IX+INBUFL+1)        (IE EXPECTED INPUT LENGTH=0)
            JP      Z,EXITTO             IF SO THEN END THIS DSB
            JP      EXITTO1              ELSE WAIT FOR 'DONE' FROM OTHER DEVICE
RNAK        BIT     DNAK,D               NAK?
            JP      Z,RBSY
RNAK1       LD      HL,NAKS              UPDATE NAK COUNT
            DEC     (HL)
            JP      Z,EXITTO             TOO MANY NAKS ?
            JP      EXITTO2              RETRY XMISSIONS
RBSY        BIT     DBUSY,D              DEVICE BUSY
            JP      Z,REND
            LD      A,(IX+DSBSTA)        SEE MIS-COMMUN. CAUSED NAK OR TIMEOUT
            AND     2**DNAK
            JR      NZ,RESOK1            THEN WE ASSUME AN ACK WAS GOOFED UP
            JP      RNAK1                ELSE DEVICE IS BUSY RETRY
REND        BIT     DDEND,D              END ?
            JP      NZ,EXITID            IF NOT A DEVICE END SEE IF DATA WAS GOOD
            BIT     DBADD,D              BAD DATA?
            JR      Z,RDACK              NO SO WE RECEIVED DATA, ACK IT
            LD      A,NAKCHR             NAK BAD DATA
            CALL    SNDANE
            JP      EXITTO1
RDACK       LD      A,ACKCHR
            CALL    SNDANE
            JP      EXITTO
*

*           READ RESPONSE TO COMMAND FROM LINK
RDRES0
            CALL    GETCHR
RDRES       LD      C,A                  SAVE CHAR FOR TESTING
            CP      STCHR                IF CHAR IS ZERO THEN IT IS START SO SKIP IT
            JP      Z,RDRES0
            CP      80H                  80H AND ABOVE ARE ADDRESSES
            JP      P,RDMES
            CALL    GETCHR
            CP      80H
            JP      P,RDMES              REDUNDANT CHAR SHOWS ERROR
            LD      B,2                  SEE IF ACK/NAK/END
RDTYP       CP      ACKCHR
            JR      NZ,RDNAK
            LD      D,2**DACK
            RET
RDNAK       CP      NAKCHR
            JR      NZ,RDEND
            LD      D,2**DNAK
            RET
RDEND       CP      ENDCHR
            JR      NZ,RDBSY
            LD      D,2**DDEND
            LD      (IX+DEVSTA),0        NO ERROR FROM DEVICE
            RET
RDBSY       CP      BSYCHR               DEVICE BUSY RESPONSE ?
            JP      NZ,RDNXT
            LD      D,2**DBUSY
            RET
RDNXT       LD      A,C
            DJNZ    RDTYP
            LD      D,2**DNAK            IF NONE OF ABOVE ASSUME IT WAS A NAK
            RET
RDMES       CALL    GETCHR               GET SECOND 'TO' ADDRESS
            CALL    GETCHR               GET FROM ADDRESS
            CALL    READLNK              READ DATA
            RET
*           SEND COMMAND MESSAGE TO LINK
SENDM       SET     DPI,(IX+DSBSTA)      INDICATE DSB WILL BE READY TO RECEIVE
            LD      H,(IX+OBDPTR)        OUTPUT BUFFER DESCRIPTOR ADDRESS
```

```
           LD      L,(IX+OBDPTR+1)
           LD      A,STCHR           SEND START CHAR
           CALL    PUTCHR
           LD      A,(IX+DEVICE)     'TO' ADDRESS
           CALL    PUTCHR
           CALL    PUTCHR
           IN      A,(ALNADR)        SEND 'FROM' ADDRESS
           LD      B,A               START LRC/HASH
           LD      C,A
           CALL    PUTCHR
           LD      A,(IX+DSBCOM)     SEND COMMAND
           CALL    PUTCHR
           PUSH    BC                SAVE LRC/HASH ON STACK
           LD      A,H
           OR      A                 SEE IF OUTPUT BUFFER TO SEND OR SKIP ONLY
           JP      Z,SNDLRC
SNDBUF     LD      A,(HL)            SEND NEXT OUTPUT BUFFER IF ANY (IE <>0)
           OR      A
           JP      Z,SNDLRC          IF NONE SEND LRC/HASH
           LD      D,A               BUFFER ADDRES AND LENGTH
           INC     HL
           LD      E,(HL)
           INC     HL

LD      B,(HL)
           INC     HL
           LD      C,(HL)
           INC     HL
           EX      (SP),HL           PUT OBDPTR ON STACK/ GET LRC/HASH IN HL
           JP      SNDOCK            GO TEST IF ZERO CHARS TO SEND
SNDNXT     IN      A,(LTNKST)        SEND NEXT CHAR
           AND     LNKORD
           JR      Z,SNDNXT
           LD      A,(DE)
           OUT     (LTNK),A
           XOR     H                 UPDATA LRC
           LD      H,A
           LD      A,(DE)            UPDATE HASH
           ADD     A,L
           LD      L,A
           INC     DE                NEXT BYTE
           DEC     BC                IS ALL OF THIS BUFFER SENT
SNDOCK     LD      A,B
           OR      C
           JR      NZ,SNDNXT
           EX      (SP),HL           YES, GET NEXT POINTER IN OBDPTR TO BUFFER
           JR      SNDBUF
SNDLRC     POP     HL                GET LRC/HASH FROM STACK
           LD      A,H               SEND LRC
           XOR     (IX+DSBCOM)         (INCLUDE COMMAND SENT)
           CALL    PUTCHR
           LD      A,L
           ADD     A,(IX+DSBCOM)       (INCLUDE COMMAND IN HASH ALSO)
           CALL    PUTCHR            SEND HASH
CLRUART    CALL    GETCHR            CLEAR ANY CHARS FROM TRANSMIT COMING AROUND
           JR      NZ,CLRUART
           RET
*
*          REMOVE DSB FROM DEVICE ACTIVITY LIST . IX POINTS AT IT
REMDSB     SET     DOONE,(IX+DSBSTA)   SET DONE FIRST
           RES     DPT,(IX+DSBSTA)     CLEAR DATA PENDING BIT
           LD      HL,IOCTL            SEE IF UNKNOWN DSB WAS USED (DSBX)
           BIT     UNKREC,(HL)
           JR      Z,REMO
           LD      HL,DSBX           IT WAS
           JR      REM1
REMO       LD      H,DEVTAB/256      DEVTAB ON 256 BYTE BOUNDARY
           LD      L,(IX+DEVICE)
           SLA     L                 2 BYTE WIDE VECTOR
REM1       LD      D,(IX+DSBLNK)     COPY DSBLNK TO DEVICE ACTIVITY LIST
           LD      (HL),D
           LD      A,D               NUL LINK ?
```

```
            OR      A
            JP      Z,REMINT
            INC     HL
            LD      E,(IX+DSBLNK+1)
            LD      (HL),E
            CALL    INSDSB              INSERT THIS NEW DSB ON READY TO SEND LIST.
*                                       DE HOLDS ADDRESS AS IS REQUIRED
*           IF INTERRUPT ADDRESS IS SET IN DSB THEN PUT DSB ON NUL INTERRUPT LIST
*           NOTE THAT IX IS DESTROYED. (NO LONGER POINTS AT FRONT OF DSB)
REMINT      LD      A,(IX+INTADR)
            OR      A
            RET     Z
            LD      DE,DSBLNK           POINT AT DSB LINK FOR INTERRUPT LINKED LIST
            ADD     IX,DE
            LD      HL,(INTHEAD)        IF INTHEAD=NUL THEN

LD      A,H
            OR      A
            JR      NZ,ADDTAIL
            LD      (INTHEAD),IX        INTHEAD = DSB
            LD      HL,INTLSW           INTERRPUT PENDING IS SET
            SET     0,(HL)
            JR      ADDONE
ADDTAIL     PUSH    IX                  ELSE
            POP     DE
            LD      HL,(INTAIL)
            LD      (HL),D
            INC     HL
            LD      (HL),E
ADDONE      LD      (INTAIL),IX         INTAIL=DSB
            LD      (IX+0),0
            RET
*
*           INSDSB PUTS A DSB IN READY TO SEND QUEUE LINKED THROUGH
*                  THE INRECL FIELD OF DSB
*           NOTE THAT IF (DE)=0 THEN ROM LOCATION 0 IS ACCESSED BUT IT WILL
*           CAUSE A RETURN AS A 'C3' IS THERE AND THAT LOOKS LIKE DPI=1
INSDSB      LD      A,(DE)              SEE IF DPI BIT ALREADY SET IF SO
            BIT     DPI,A               NO NEED TO QUEUE FOR TRANSMISSION
            RET     NZ
            LD      HL,(NXTDSB)         SEE IF QUEUE EMPTY
            LD      BC,INRECL+1
            LD      A,H
            OR      A
            JP      NZ,INSLST           IF NOT ADD AT END ELSE-ADD AT FRONT
            LD      (NXTDSB),DE
            LD      (LSTDSB),DE         AND REAR
            JP      INSZER
INSLST      LD      HL,(LSTDSB)         GET LAST DSB AND LINK TO NEW LAST
            ADD     HL,BC
            LD      (HL),D                      STORE IN Z80 WORD ORDER
            DEC     HL
            LD      (HL),E
            LD      (LSTDSB),DE                 SAVE NEW LAST POINTER
INSZER      LD      H,D                 POINT NEW LAST DSBS INRECL TO NULL
            LD      L,E
            ADD     HL,BC
            LD      (HL),0              AGAIN Z80 ORDER
            RET
*
*           FIRST CHAR INT IMPLIES RECEIVING A MESSAGE/COMMAND FROM LINK
*               BECAUSE WE DID NOT HAVE ANYTHING TO SEND OR WE LOST BID FOR LINK
RECCLSL     LD      A,B                 SEE IF FIRST CHAR IS CLOSELINK CHAR
RECBRK      CP      CLOSEL              IF NOT THEN 'CHAR' MUST BE NOISE GLITCH
            JP      NZ,WAITGAP          SO IGNORE AND WAIT FOR ANOTHER GAP
RECCC       LD      A,(IOCTL)           INDICAT CLOSELINK CHAR WAS RECEIVED
            SET     RECSET,A
            RES     BRKLNK,A            MAKE SURE LINK IS CLOSED AND WAIT FOR INPUT
            JP      WAITGPS             NOW WAIT FOR DATA TO COME IN
RECSC       CALL    TIMEO               GET START CHAR
            JP      Z,INTRETE           TIMED OUT. SO IGNORE
RECEIVE     CP      STCHR               START CHAR?
```

```
         JR     NZ,RECSC
         IN     A,(ALNADR)        SEE IF MESSAGE TO US. COMPARE TO OUR ADDRESS
         LD     C,A
         CALL   GETCHR
         JP     Z,WAITGAP         IF NO CHAR CAME THEN IGNORE
         LD     D,0               INDICATE NOT POWERUP DEVICE (YET)
         CP     C

JR     Z,RECRED          IF TO US CHECK REDUNDANT ADDRESS
         CP     DVRADR            ELSE SEE IF POWERUP MESSAGE. (TO COMPLETE DSB)
         JP     NZ,WAITGAP
         LD     C,DVRADR
         LD     D,2**DPUP
RECRED   CALL   GETCHR
         JP     Z,WAITGAP
         CP     C                 (REDUNDANT 'TO' ADDRESS)
         JP     NZ,WAITGAP
         CALL   GETCHR            GET FROM ADDRESS
         LD     C,A               SAVE IN CASE NEEDED FOR 'UNKNOWN' DSB
         ADD    A,A               SEE IF SENDER HAS DSB IN DEVICE ACTIVITY LIST
         LD     H,DEVTAB/256      DEVICE ACT. TAB. IS ON 256 BYTE BOUNDARY
         LD     L,A
         LD     A,(HL)
         OR     A
         JP     NZ,RECRE2         GET DSBPTR
         BIT    DPUP,D            SEE IF POWERUP MESSAGE. IF SO IGNORE
         JP     NZ,WAITGAP
         LD     HL,IOCTL          INDICATE UNKNOWN DSB RECEIVED
         SET    UNKREC,(HL)
         LD     HL,(DSBX)         GET 'UNKNOWN' DSBPTR AND CHECK IT
         LD     A,L
         OR     A                 'UNKNOWN' EXISTS?
         JP     Z,RECBSY          NOPE
         LD     L,H               REVERSE ORDER OF HL (ORIG. ORDER WAS NOT Z80)
         LD     H,A
         PUSH   HL
         INC    HL                SAVE 'UNKNOWN' ADDRESS
         LD     (HL),C
         IN     A,(LINK)          NO NEED TO TEST STATUS BECAUSE OF DELAY
         JP     RECRDY            BETWEEN CHARS CAUSED BY CODE
RECRE2   CALL   GETCHR            GET STATUS CHAR HERE TO PREVENT OVERRUN
         LD     B,(HL)            SEE IF DSB STATUS IS BUSY(COMMAND SENT)
         INC    HL
         LD     C,(HL)            AND NOT JUST WAITING TO SEND
         PUSH   BC                GET DSB IN IX REG
RECRDY   POP    IX
         BIT    DPT,(IX+DSBSTA)
         JP     Z,RECBSY          NO COMMAND ISSUED SO IGNORE
         BIT    DPUP,D
         JP     NZ,RECXIT
         CALL   READDTA           READ MESSAGE THAT COMES IN
         BIT    DBADD,D           WAS DATA BAD (LRC/HASH INCORRECT)
         JR     NZ,RECNAK         NAK IF IT WAS
         LD     B,ACKCHR          ELSE ACK
         CALL   SNDANE
RECXIT   LD     (IX+DSBSTA),D     SET STATUS BEFORE DSB REMOVAL
         CALL   REMDSB            SINCE DSB IS SATISFIED, REMOVE IT FROM ACTIVITY
         JP     WAITGAP              LIST
RECNAK   LD     B,NAKCHR
         CALL   SNDANE
         DEC    (IX+DSBNAK)       TOO MANY NAKS SENT
         JP     Z,RECXIT
         JP     EXITT02
RECBSY   BIT    DPUP,D
         JP     NZ,WAITGAP
         CALL   CLRUART
         LD     B,BSYCHR          BUSY CHAR
         CALL   SNDANE
         JP     WAITGAP
*
*        READ THE DATA COMING IN FROM LINK USING BUFFER IN DSB POINTED TO BY
```

```
                IX RFG. SET FLAGS IN DSB ACCORDING TO 'CORRECTNESS' OF DATA (LRC/HASH)
READLNK  LD     R,CHRDLY          TIMEOUT ON CHAR IF NONE COME
         IN     A,(LTNKST)
         AND    LNKIRD
         JP     NZ,READDS         A CHAR CAME (DEVICE STATUS OR COMMAND )
         DJNZ   READLNK+2
         JP     READBAD1          NO CHAR CAME AND IT SHOULD HAVE
READDS   IN     A,(LTNK)
READDTA  PUSH   AF                SAVE DEVICE STATUS TILL WE ARE SURE OF GOOD REC
         LD     D,(IX+TNBUFA)     GET INPUT BUFFER ADDRESS
         LD     E,(IX+TNBUFA+1)
         LD     B,(IX+TNBUFL)     GET BUFFER MAX LENGTH
         LD     C,(IX+TNBUFL+1)
         LD     H,A               START LRC,HASH
         LD     L,A               NOTE THAT 'FROM' ADDRESS NEEDS TO BE INCLUDED
         PUSH   BC                SAVE LENGTH
READNXT  LD     B,CHRDLY          GET NEXT CHAR UNTIL DONE
         IN     A,(LTNKST)
         AND    LNKIRD
         JP     NZ,READGOT
         DJNZ   READNXT+2         NO CHAR OR TIMEOUT YET
READONE  EX     DE,HL
         LD     B,(IX+DEVICE)     INCORPORATE 'FROM' ADDRESS IN LRC/HASH
         LD     A,D
         XOR    B
         LD     D,A
         DEC    HL                CALC(LRC)=INPUT(HASH)
         CP     (HL)
         JP     NZ,READBAD        NO MATCH MEANS BAD DATA
         LD     A,E
         ADD    A,B
         SUB    D                 INPUT(HASH)=CALC(LRC). REPLACE SUB(HL)
         DEC    HL                INPUT(HASH)=CALC(HASH)-INPUT(HASH)-INPUT(LRC)
         SUB    (HL)
         CP     D
         JP     NZ,READBAD
         POP    DE                FIND THE INPUT LENGTH
         INC    DE                DELETE COUNT OF LRC/HASH
         INC    DE
         LD     H,(IX+TNBUFL)
         LD     L,(IX+TNBUFL+1)
         XOR    A                 CLEAR CARRY
         SBC    HL,DE
         LD     (IX+INRECL),H
         LD     (IX+INRECL+1),L   SAVE THE INPUT LENGTH IN DSB INPUT LENGTH
         LD     D,2**DPI          DATA IS GOOD, CLEAR STATUS BITS
         POP    AF                GET DEVICE STATUS FROM STACK AND INTO DSB
         LD     (IX+DEVSTA),A
         RET
READGOT  IN     A,(LTNK)          READ THE CHAR
         LD     (DE),A            SAVE IT IN BUFFER
         XOR    H                 LRC
         LD     H,A
         LD     A,(DE)
         ADD    A,L               HASH
         LD     L,A
         INC    DE
         EX     (SP),HL           DEC INPUT COUNT
         DEC    HL
         LD     A,H
         OR     L
         EX     (SP),HL
         JR     NZ,READNXT

CALL   GETCHR            SHOULD BE NO MORE CHARS
         JR     Z,READONE
READCLR  CALL   CLRUART
READBAD  POP    HL                REMOVE CHAR COUNT FROM STACK FOR RETURN
         POP    HL                REMOVE DEVICE STATUS FROM STACK AND DISCARD
READBAD1 LD     D,2**DBADD        BAD DATA RECEIVED
         RET
```

```
*
*       UTILITY I/O ROUTINES USED IN VARIOUS LOCATIONS ABOVE
PUTCHR  PUSH    AF                      OUTPUT CHAR IN A TO LINK
        IN      A,(LTNKST)
        AND     LNKORD
        JR      Z,PUTCHR+1
        POP     AF
        OUT     (LTNK),A
        RET
TIME0   LD      B,TIMODLY               TIMEOUT0 WAITING FOR A CHAR ONLINK
        JP      GETCHR+2
GETCHR  LD      B,CHRDLY-1              GET A CHAR FROM LINK OR TIMEOUT IF NONE (Z SET)
        IN      A,(LTNKST)
        AND     LNKIRD
        JR      NZ,GETCH1
        DJNZ    GETCHR+2
        RET
GETCH1  IN      A,(LTNK)
        RET
SNDANE  LD      A,(IOCTL)               OPEN LINK FOR SENDING RESPONSE
        SET     RRKLNK,A
        OUT     (LNKCTL),A
        LD      A,STCHR                 SEND SHORT RESPONSE (ACK/NAK/END DEPENDING ON B)
        CALL    PUTCHR
        LD      A,B
        CALL    PUTCHR
        CALL    PUTCHR                  RETURN FROM PUTCHR RETURNS FROM SNDANE
        LD      B,34                    WAIT FOR CHARS TO COMPLETE TO CLOSE LINK
        DJNZ    S
        LD      A,(IOCTL)
        OUT     (LNKCTL),A
        RET
*
*       CODE FOR CRT CONTROLLER FOLLOWS
*
*
*
        TITLE   'ALINE CONSOLE CONTROLLER V2.1'
*
*       ALINE CONSOLE CONTROLLER NEW PROTOCOL
*       AUTHOR JOE KUBLER
*
*       HISTORY
*
*       MAR 31,1980     CUSTOMER DISPLAY ADDED
* V2.0  ADD POWER UP RESET MESSAGE
*
* V2.1  CHANGE CUSTOMER DISP TO BE NON-INTERRUPT DRIVEN BECAUSE OF
*       TIMING PROBLEMS WITH LINK PROTOCOL
*
*       FLAG 1 INDICATES THAT A KEY HAS BEEN READ BUT NOT SENT .
*
SUB     MACRO   AC,VAL
        CPL     AC
        ADD     AC,VAL
        CPL     AC
        ENDM
DVRADR  EQU     7EH     POWER UP RESET MESSAGE TO ADDRESS
ACKCHR  EQU     78H
NAKCHR  EQU     19H
ENDCHR  EQU     55H
BSYCHR  EQU     2CH
CLOSEL  EQU     55H
STCHR   EQU     5EH             START CHAR
MAXNAK  EQU     255             MAXIMUM RETRIES OF MESSAGE/RESPONSE
GAPREC  EQU     94              TIMEOUT FOR GAP IN PROTOCOL
GAPSND  EQU     90              EXTRA TIME BEFORE PROTOCOL ALLOWS SENDING
TIME1   EQU     112             TIMEOUT1
TIME0   EQU     25              TIMEOUT0
COTSP   EQU     49      CUSTOMER DISPLAY BUFF AT MID STACK
KEYBUF  EQU     COTSP+4 KEYRETURN BUFFER NEEDS 3 BYTES
```

```
SAVBA    EQU     KEYBUF+6
BUFA     EQU     29        INPUT BUFFER ADDRESS
KOTIM    EQU     140                 MAXIMUM TIME TO WAIT FOR EMPTYING KEY BUFFER
CDOFF    EQU     0F7H
CDON     EQU     8
         ANL     P2,#7FH             CLOSE LINK
         ENTO    CLK
         CALL    INIT                INIT DISPLAY
         JMP     BEGIN
         ORG     7
         DJNZ    R6,TRET
         ORL     P1,#2               TURN OFF CASH DRAW SOLENOID
         STOP    TCNT
TRET     RETR
BEGIN    MOV     R0,#CDTSP
         MOV     @R0,#0
         CPL     F1                  SEND POWER UP RESET MESSAGE
         MOV     R0,#KEYBUF
         MOV     @R0,#1
         INC     R0
         MOV     @R0,#DVKADR
         INC     R0
         ANL     P1,#7FH
         IN      A,BUS
         ORL     A,#1
         MOV     @R0,A
         MOV     R7,#1               ONLY 1 TRY ON THIS MESSAGE
         JMP     GAP
SETNAK   MOV     R7,#MAXNAK
GAP      ORL     P1,#0F1H
         ORL     P2,#07FH            GET ALINE ADDRESS
         ANL     P1,#7FH
         IN      A,BUS               ALINE ADDRESS
         ANL     A,#0FEH         IGNORE LOW BIT
         MOV     R3,A                SAVE ADDRESS
         ORL     P1,#80H             DESELECT ADDRESS
         ANL     P1,#0DFH            SELECT UART
         MOV     R0,#BUFA                INPUT BUFFER POINTER
GAPST    MOV     R2,#GAPREC      FIRST PART OF 2 MSEC GAP WAITED OUT HERE
GAPT     JT1     GAPC            TIME OUT PAST ALL CHARS
         DJNZ    R2,GAPT
         JMP     GAPD
GAPC     IN      A,BUS               IGNORE CHAR
         JMP     GAPST
GAPD     MOV     R1,#CDTSP           SEE IF ANY DATA TO SEND
         MOV     A,@R1               CUSTOMER DISPLAY ?
         JNZ     BREAK
         MOV     R1,#KEYBUF          KEY

MOV     A,@R1
         JNZ     TRANS
READ     CALL    GETCHR
         JC      GAPD
         XRL     A,#CLOSEL           REQUEST TO CLOSE LINK
         JNZ     GAP
GOTCL1   ANL     P2,#7FH             CLOSE LINK
RCHR     CALL    GETCHR              GET THE CHAR SENT. LOOK FOR START CHAR
         XRL     A,#STCHR
         JNZ     RCHR                NO, THEN BID IS NOT OVER
         CALL    GETCHR              THIS DEVICE ADDRESSED?
         MOV     R5,A                SAVE TO VERIFY THAT DEVADR OR DEVADR+1 ADDRESSED
         ANL     A,#0FEH
         XRL     A,R3
         JNZ     GAP
         CALL    GETCHR              REDUNDANT ADDRESS CHAR
         XRL     A,R5
         JNZ     GAP
         MOV     A,R5                SAVE DEVICE ADDRESS THAT WAS ADDRESSED
         MOV     R3,A
         MOV     R4,#0               CLEAR LRC,HASH
         MOV     R5,#0
         CALL    RDATA               READ IN THE DATA AT R0
```

```
RDONE   DEC     R0                      CHECK LRC. CALC(LRC) = REC(HASH)
        MOV     A,@R0
        XRL     A,R4
        JNZ     NAK                     BAD LRC
        DEC     R0                      FIX HASH. CALC(HASH)=HASH+REC(LRC)+REC(HASH)
        MOV     A,R5
        SUB     A,@R0
        INC     R0
        SUB     A,@R0
        XRL     A,@R0
        JNZ     NAK
        JMP     COMMAND
NAK     MOV     R2,#NAKCHR              NAK SENDER
        CALL    ACKNAK
        JMP     GAP
DEND    MOV     R2,#ENDCHR
        JMP     ACKNAK
BUSY    MOV     R2,#BSYCHR              SEND BUSY TO SENDER
        CALL    ACKNAK
        JMP     SETNAK
RDATA   MOV     R2,#10                  TIMEOUT COUNT FOR LAST CHAR
RDTIM   JT1     RGOT                    MESSAGE CHAR
        DJNZ    R2,RDTIM
        RET
RGOT    IN      A,BUS                   READ CHAR
        MOV     @R0,A                   SAVE IN BUFFER
        XRL     A,R4                    LRC CALC
        MOV     R4,A
        MOV     A,@R0
        ADD     A,R5
        MOV     R5,A
        INC     R0                      BUMP BUFFER POINTER
        JMP     RDATA
TRANS   JF1     TREDD                   OTHERWISE SEE IF KEY IS ALREADY READ
        ORL     P1,#060H                SELECT KEY STATUS
        ANL     P1,#08FH
        ORL     P2,#40H                 SELECT STATUS
        IN      A,BUS
        JB0     XKEY
        ORL     P1,#060H                GO RECEIVE

ANL     P1,#0DFH                SELECT UART
        JMP     READ
TREDD   MOV     R1,#KEYBUF              ADDRESS OF REPEAT DATA
        JMP     BREAK                   DON'T READ KEY
XKEY    ANL     P2,#0BFH                READ KEY
        IN      A,BUS
        MOV     R1,#KEYBUF+3            SAVE THE KEY
        MOV     @R1,A
        MOV     R1,#KEYBUF+4            GET KEY LOCK STATUS
        CALL    KLOCK1
        CPL     F1                      INDICATE KEY IS NOT YET SENT
        MOV     R1,#KEYBUF
BREAK   ORL     P1,#060H                SELECT UART
        ANL     P1,#0DFH
        JT1     READ                    MAKE SURE NO CHAR HAS COME WHILE TESTING KB
        ORL     P2,#80H                 BREAK LINK
        MOV     R2,#GAPSND              NOW WAIT ADDITIONAL 2 MSEC FOR SENDING
        INC     R3                      SET R3 TO KEYBOARD ADDRESS (DEVADR+1)
BRKSND  JT1     READ                    SEE IF ANYONE STILL SENDING OR BEAT US HERE
        DJNZ    R2,BRKSND
BID     MOV     R2,#CLOSEL              BID FOR LINK. MUST OPEN ALL CLOSED DEVICES
        CALL    PUTCHR
        MOV     A,R3                            AND MAKE SURE WE ARE ONLY SENDERS
        MOV     R2,A
        CALL    PUTCHR
        CALL    GETCHR
BRKG    JC      GAP                     WAIT FOR NEXT GAP
        XRL     A,#CLOSEL
        JNZ     GAP
        CALL    GETCHR
        JC      GAP                     ERROR, CHAR DID NOT COME
```

```
          CPL     A                   SUBTRACT A FROM R3 (RECEIVED FROM OUR ADDR)
          INC     A
          ADD     A,R3
          JB7     RIDDLY              OUR ID IS LOWER SO REBID
          JNZ     GOTCH1              WE WON
          JMP     TBWON               CONFLICT. IE SOMEONE ELSE IS WAITING FOR US
RIDDLY    MOV     R2,#20              WAIT FOR LINKS TO BE CLOSED BEFORE REBID
          DJNZ    R2,$
          JMP     BID
TBWON     CALL    TSEND
          ORL     P2,#80H             MAKE SURE LINK IS OPEN
          JMP     SETNAK
TSEND     ORL     P2,#80H             BREAK LINK FOR RESPONSE
          MOV     A,R1                SET UP TO SEND PROPER RESPONSE
          MOV     R0,#SAVBA
          MOV     @R0,A
          MOV     R0,A
          MOV     A,@R0
          MOV     R1,A                GOT BUFFER IN R0 AND COUNT IN R1
          INC     R0
          MOV     R2,#STCHR           START CHAR
          CALL    PUTCHR
          MOV     A,@R0               TO ADDRESS
          MOV     R2,A
          CALL    PUTCHR
          CALL    PUTCHR              REDUNDANT
          INC     R0
          MOV     A,@R0               INIT LRC,HASH WITH FROM ADDRESS
          MOV     R4,A
          MOV     R5,A
          MOV     R2,A                AND SEND ADDRESS
          CALL    PUTCHR

MOV     R2,#0               STATUS BYTE
          CALL    PUTCHR
          DJNZ    R1,TDLOOP
          JMP     TDDONE
TDLOOP    INC     R0                  SEND THE REST OF THE CHARS
          MOV     A,@R0               GET CHAR TO SEND
          MOV     R2,A
          CALL    PUTCHR              SEND IT
          XRL     A,R4                LRC IT
          MOV     R4,A
          MOV     A,R5                HASH
          ADD     A,@R0
          MOV     R5,A
          DJNZ    R1,TDLOOP           DATA COUNTER
TDDONE    MOV     A,R4                SEND LRC
          MOV     R2,A
          CALL    PUTCHR
          MOV     A,R5                SEND HASH
          MOV     R2,A
          CALL    PUTCHR
TDMPU     MOV     R1,#10              DELAY FOR UART(ASSUMES 1 LINK TIME USED ALREADY)
          IN      A,BUS
TDMPUT    JT1     TDMPU
          DJNZ    R1,TDMPUT
          MOV     R1,#TIME1                    WAIT FOR RESPONSE
TRES      JT1     RAKNAK
          DJNZ    R1,TRES             TIMEOUT ON DEVICE
          JMP     RNAK                      INPUT BUFFER
RAKNAK    MOV     R0,#BUFA
          IN      A,BUS
          XRL     A,#STCHR            HAS TO BE A START CHAR
          JNZ     SREI
          ANL     P2,#7FH             CLOSE LINK TO LET REPONSE GO AROUND
          CALL    RDATA
          DEC     R0                  TEST TWO CHARS
          MOV     R1,#2               TEST EACH CHAR
RCHK      MOV     A,@R0
          XRL     A,#ACKCHR
          JZ      RACK
```

```
              MOV      A,@R0
              XRL      A,#BSYCHR
              JZ       RACK
              MOV      A,@R0
              XRL      A,#NAKCHR
              JZ       RNAK
              DEC      R0                    POINT AT NEXT CHAR
              DJNZ     R1,RCHK
RNAK          IN       A,BUS                 MAKE SURE UART IS CLEAR AFTER TESTING LINK
              DJNZ     R7,SRET               TRY MAXNAKS TIMES
RACK          MOV      R0,#SAVBA             NO KEY WANTED AND NONE TO SEND
              MOV      A,@R0
              MOV      R0,A
              MOV      @R0,#0
SRET          RET
              TITLE    'ALINE PRINTER CONTROLLER V2.0'
*
*             ALINE 26 OR 40 COLUMN CHARACTER PRINTER. USES LINKLESS
*             PROTOCOL
*             AUTHOR JOE KUBLER
*             DATE WRITTEN:   8/28/79
*             V2.0
*             DETECT LOW PAPER AND COVER OPEN
*             6/06/80          POWER UP RESET MESSAGE IMPLEMENTED

SUB           MACRO    AC,VAL
              CPL      AC
              ADD      AC,VAL
              CPL      AC
              ENDM
DVRADR        EQU      7EH                   POWER UP RESET MESSAGE TO ADDRESS
ACKCHR        EQU      78H
NAKCHR        EQU      19H
ENDCHR        EQU      55H
BSYCHR        EQU      2CH
CLOSEL        EQU      55H
STCHR         EQU      5EH                   START CHAR
BUFA          EQU      14H                   COMMAND INPUT/COMMAND END BUFFER
MAXNAK        EQU      255
GAPREC        EQU      98                    TIMEOUT FOR GAP
GAPSND        EQU      90                    ADDITIONAL TIME IN PROTOCOL FOR SENDING
TIME0         EQU      40                    TIMEOUT 0 FOR PROTOCOL
TIME1         EQU      100
*
START         ANL      P2,#7FH               CLOSE LINK (POWER UP OPENS IT)
              CALL     PUTEST
              CPL      F0                    SET UP POWERUP RESET MESSAGE
              MOV      R7,#1
              MOV      R0,#BUFA
              MOV      @R0,#DVRADR
              JMP      GAP
SETNAK        MOV      R7,#MAXNAK
GAP
              IN       A,P2                  ALINE DEVICE ADDRESS
              ORL      A,#80H                ONLY LOW 7 BITS OF ADDRESS WERE SET
              MOV      R3,A                      SAVE ADDRESS
              MOV      R0,#BUFA                  INPUT BUFFER POINTER
GAPST         MOV      R2,#GAPREC                GAP TIME
GAPT          JT0      GAPC                  TIME OUT PAST ALL CHARS
              DJNZ     R2,GAPT
              JMP      GAPD
GAPC          IN       A,BUS                 IGNORE CHAR
              JMP      GAPST
GAPD          JF0      BREAK                 SEND DONE
              IN       A,P1                  PRINTER TEST BUTTON PRESSED?
              JB6      GAPCL
              JMP      /TEST
GAPCL         CALL     GETCHR
              JC       GAPD
              XRL      A,#CLOSEL
              JNZ      GAP                   IF NOT CLOSE LINK REQUEST THEN INGNORE
              ANL      P2,#7FH               CLOSE LINK
```

```
RCHR     CALL    GETCHR          GET THE CHAR SENT. LOOK FOR START CHAR
         JC      RCHR
         XRL     A,#STCHR
         JNZ     RCHR            NO, THEN BID IS NOT OVER
         CALL    GETCHR          THIS DEVICE ADDRESSED?
         XRL     A,R3
         JNZ     GAP
         CALL    GETCHR          REDUNDANT ADDRESS CHAR
         XRL     A,R3
         JNZ     GAP
         JF0     BSY             SEND BSY IF LAST COMMAND NOT DONE
         MOV     R4,#0           CLEAR LRC,HASH
         MOV     R5,#0
         MOV     R6,#0           BYTE COUNT
         CALL    RDATA           READ IN THE DATA AT R0
RDONE    DEC     R0              CHECK LRC. CALC(LRC) = REC(HASH)

MOV     A,@R0
         XRL     A,R4
         JNZ     NAK             BAD LRC
         DEC     R0              FIX HASH. CALC(HASH)=HASH+REC(LRC)+REC(HASH)
         MOV     A,R5
         SUB     A,@R0
         INC     R0
         SUB     A,@R0
         XRL     A,@R0
         JNZ     NAK
         JMP     COMMAND
ACK      MOV     R2,#ACKCHR
ACKNAK   MOV     A,#STCHR
         ORL     P2,#80H         BREAK LINK FOR RESPONSE
         MOVX    @R1,A
ANW
         CALL    PUTCHR
         CALL    PUTCHR
         MOV     R2,#40
         DJNZ    R2,$
         ANL     P2,#7FH         CLOSE LINK AGAIN
         RET
NAK      MOV     R2,#NAKCHR      NAK SENDER
         CALL    ACKNAK
         MOV     R0,#BUFA        SET UP FOR POSSIBLE RE-RECEPTION
         JMP     GAP
DEND     MOV     R2,#ENDCHR
         JMP     ACKNAK
BSY      CALL    GETCHR
         JC      BSY
         MOV     R2,#BSYCHR
         JMP     ACKNAK
PUTCHR   JT1     $+4
         JMP     PUTCHR          WAIT ON LAST CHAR
         MOV     A,R2
         MOVX    @R1,A           OUTPUT WITHOUT BUS LATCH
         RET
GETCHR   MOV     R1,#TIMEO       TIMEOUT ON CHARS
         CLR     C
GETCHR1  JT0     GETCHR2         INPUT CHAR FROM LINK
         DJNZ    R1,GETCHR1
         CPL     C
         RET
GETCHR2  IN      A,BUS
         RET
RDATA    MOV     R2,#15          TIMEOUT COUNT FOR LAST CHAR
RDTIM    JT0     RGOT
         DJNZ    R2,RDTIM
         RET
RGOT     IN      A,BUS           READ CHAR
         MOV     @R0,A           SAVE IN BUFFER
         INC     R0              BUMP BUFFER POINTER
         XRL     A,R4            LRC CALC
         MOV     R4,A
         IN      A,BUS           HASH CALC
```

```
              ADD     A,R5
              MOV     R5,A
              INC     R6
              JMP     RDATA           COUNT BYTE
BREAK         MOV     R2,#GAPSND      WAIT TO SEND
BRKSND        JFO     GAPCL           IF ANYONE BEAT US SEE WHAT THEY SENT
              DJNZ    R2,BRKSND
              ORL     P2,#80H         BREAK LINK TO BID

BID           MOV     A,#CLOSEL       MAKE SURE OTHER DEVICES CLOSE LINK
              MOV     R2,#CLOSEL
              CALL    PUTCHR
              MOV     A,R3            BID TO MAKE SURE OF ONLY ONE SENDER
              MOV     R2,A
              CALL    PUTCHR
              CALL    GETCHR
              JNC     BRKT
BRKG          JMP     GAP
BRKT          XRL     A,#CLOSEL
              JNZ     BRKG
              CALL    GETCHR          SEE IF WE WON BID
              JC      BRKG            TIMEOUT
              CPL     A               SUBTRACT A FROM R3 (RECEIVED FROM OUR ADDR)
              INC     A
              ADD     A,R3
              JB7     BIDDLY          OUR ID IS LOWER SO REBID
              JZ      TBWON           WE WON
              ANL     P2,#7FH
              JMP     RCHR            CONFLICT. IE SOMEONE ELSE IS WAITING FOR US
BIDDLY        MOV     R2,#20
              DJNZ    R2,$
              JMP     BID
TBWON         CALL    TSEND
              ORL     P2,#80H         MAKE SURE LINK IS OPEN
              JFO     GAP
              JMP     SETNAK
*
              ORG     100H
TSEND         ORL     P2,#80H         BREAK LINK FOR RESPONSE
              MOV     R0,#BUFA
              MOV     R1,#1
              MOV     A,R3
              MOV     R4,A
              MOV     R5,A
TDATA         MOV     R2,#STCHR       START CHAR
              CALL    PUTCHR
              MOV     A,@R0           TO ADDRESS
              MOV     R2,A
              CALL    PUTCHR
              CALL    PUTCHR          REDUNDANT
              MOV     A,R3            OUR ADDRESS (FIRST CHAR IN HASH LRC)
              MOV     R2,A
              CALL    PUTCHR
TDLOOP        INC     R0              SEND THE REST OF THE CHARS
              MOV     A,@R0           GET CHAR TO SEND
              MOV     R2,A
              CALL    PUTCHR          SEND IT
              XRL     A,R4            LRC IT
              MOV     R4,A
              MOV     A,R5            HASH
              ADD     A,@R0
              MOV     R5,A
              DJNZ    R1,TDLOOP       DATA COUNTER
              MOV     A,R4            SEND LRC
              MOV     R2,A
              CALL    PUTCHR
              MOV     A,R5            SEND HASH
              MOV     R2,A
              CALL    PUTCHR
TOMPU         MOV     R1,#15          DELAY FOR UART(ASSUMES 1 LINK TIME USED ALREADY)
              IN      A,BUS
TOMPUT        JFO     TOMPU
```

```
            DJNZ    R1,INPUT
            MOV     R1,#TIME1               WAIT FOR RESPONSE
TRES        JT0     RAKNAK
            DJNZ    R1,TRES
            JMP     RNAK                    TIMEOUT ON LINK
RAKNAK      MOV     R0,#18H                 INPUT BUFFER
            IN      A,BUS                   SEE THAT START CHAR IS FIRST
            XRL     A,#STCHR                IF NOT THEN NOISE ON LINK SO IGNORE
            JNZ     SRET
            ANL     P2,#7FH                 CLOSE LINK TO LET RESPONSE GO AROUND LINK
            CALL    RDATA
            DEC     R0                      GET LAST CHAR IN BUFFER
            MOV     R1,#2                   TEST EACH CHAR
RCHK        MOV     A,@R0
            XRL     A,#ACKCHR
            JZ      RACK
            MOV     A,@R0
            XRL     A,#BSYCHR
            JZ      RACK
            MOV     A,@R0
            XRL     A,#NAKCHR
            JZ      RNAK
            DEC     R0                      POINT AT NEXT CHAR
            DJNZ    R1,RCHK
RNAK        IN      A,BUS                   MAKE SURE UART IS CLEAR AFTER TESTING LINK
            DJNZ    R7,SRET                 TRY AGAIN MAXNAKS TIMES
RACK        CLR     F0                      DON'T WANT TO SEND ANYMORE
SRET        RET
            TITLE   'ALINE CRT CONTROLLER V1.1
*           ALNCRT  ALINE CRT CONTROLLER
*
*
*           HISTORY
*
*           AUTHOR  JOE KUBLER
*
*           VER 1.0 SEPT. 3,1979
*
*
*           VER 1.1 APRIL 3,1981
*           ADDED SELF TEST SOFTWARE
*
*
*
*                   CONSTANTS
WRT         EQU     1               WRITE COMMAND FROM ALINE
KEYRD       EQU     2               READ KEY COMMAND FROM ALINK TO DEVICE ALINE ADDRESS+1
KEYRDY      EQU     1               KEYBOARD READY STATUS BIT
KEYST       EQU     11H             KEYBOARD STATUS PORT
KEYDB       EQU     10H             KEYBOARD DATA PORT
BUZZC       EQU     4               BUZZER ON COMMAND
CLRBUF      EQU     20H             CLEAR KEYS AND READ FIRST KEY COMMAND
KEYTIM      EQU     100             TIMEOUT TO CLEAR KEYS
BUZTIM      EQU     0A23H           BUZZER ON TEST TIMEOUT
ALSTAT      EQU     21H             ALINE UART STATUS INPUT PORT
ALIN        EQU     20H             ALINE INPUT
ALOUT       EQU     20H             ALINE OUTPUT
CRT         EQU     21H             CRT REFRESH ENABLE/HI LOW RAM SELECT
PROCRE      EQU     8               PROCESSOR RAM ENABLE VALUE (BIT 3)
CREG0       EQU     0
CREG1       EQU     1
CREG2       EQU     2
CREG3       EQU     3
CREG4       EQU     4
CREG5       EQU     5
CREG6       EQU     6

CKR         EQU     0CH             X CURSOR OF 5027
CYR         EQU     0DH             Y CURSOR OF 5027
CSTART      EQU     0EH             TRIGGER TO 5027 TO START DISPLAY
C5027       EQU     0AH             RESET 5027
ALDR        EQU     8               MASK FOR UART DR STATUS
ALTBR       EQU     10H             MASK FOR UART TBR STATUS
ALNADR      EQU     22H             ALINE ADDRESS
BUZZER      EQU     22H             BUZZER PORT ADDRESS
```

```
BUZZ     EQU    1              TURN BUZZER ON
GAPREC   EQU    51             TIME OUT FOR PROTOCOL GAP
GAPSND   EQU    51             TIME OUT FOR SENDING
TIMO     EQU    20             TIMEOUT0
TIM1     EQU    77             TIMEOUT1
CHRDLY   EQU    12             1 CHAR TIME 88 MICROSEC
DVRADR   EQU    7EH            POWER UP RESTART MESSAGE TO ADDRESS
MAXNAK   EQU    255            MAXIMUM NAKS
NAKCHR   EQU    19H
ACKCHR   EQU    78H
BSYCHR   EQU    2CH
CLOSEL   EQU    55H
STCHR    EQU    5EH
TSTCHR   EQU    1
BRKCHR   EQU    0C0H           BREAK LINK OUTPUT ON SOD
FIXCHR   EQU    40H            RESTORE LINK
EOBUF    EQU    3              END OF BUFFER MARKER
*        ATTRIBUTES FOR CRT ARE BY BIT
*        BIT    USE
*        0      BLINK
*        1      REVID
*        2      UNDERLINE
*
*        BIT 3 IS THE PROCESSOR/CRT ENABLE BIT. IT IS ALWAYS ON IN HATR
FHATR    EQU    PROCRE         INITIAL ATTRIBUTE VALUE
FSATR    EQU    80H            INITIAL 'SOFT' ATTRIBUTE VALUE
*                              IT IS AUTOCRLF
AUTOLF   EQU    80H
CURSOR   EQU    2              MASK FOR CURSOR ON BIT IN FSATR
BLANK    EQU    ' '
LINES    EQU    16             NUMBER OF LINES ON CRT
CHARS    EQU    40             NUMBER OF CHARS ON LINE
ACTWID   EQU    64             IN SMALL CRT EACH LINE IS STORED IN 64 BYTES
EXCESS   EQU    ACTWID-CHARS   EXTRA CHARS TO IGNORE AS A RESULT
CRTMEM   EQU    8000H
DSPLOC   EQU    8005H          LOCATION OF POWER UP VERSION MESSAGE
RAM      EQU    4000H
RAMLEN   EQU    03FFH
RAMPAT   EQU    55H            PATTERN FOR RAM TEST
TSTKEY   EQU    3              KEY CODE FOR SELF TEST
CR       EQU    00H            CARRIAGE RETURN
LF       EQU    10             LINE FEED
ESC      EQU    1BH            ESCAPE CHAR
DEL      EQU    7FH            DELETE CHAR
TABC     EQU    9              TAB
***********************************************************
SETNAK   MVI    A,MAXNAK       RE-INITIALIZE NAK COUNT
         STA    NAKS
GAP
READAL   IN     ALNADR         THIS DEVICES ADDRESS
         MOV    C,A
         MVI    B,GAPREC
GAP1     IN     ALSTAT         TIME OUT FOR GAP
         ANI    ALDR
         JNZ    GAPCLR

DCR    A
         JNZ    GAP1
         JMP    GOTGAP         GAP FOUND
GAPCLR   IN     ALIN           CLEAR CHAR, GET GAP
         JMP    GAP
GOTGAP   LDA    SYSREQ         DATA TO SEND ?
         ORA    A
         JNZ    BREAK          YES
GKEY     LDA    KEYMASK        WAITING FOR A KEY ?
         ORA    A
         JNZ    GETKEY
GETO     CALL   GETCHR
         JZ     GOTGAP
RCHR     IN     ALIN           SEE IF CLOSE LINK REQUEST
         CPI    CLOSEL
         JNZ    READAL         IF NOT THEN IT WAS NOISE ON LINK
```

```
RCLOSE    MVT   A,FIXCHR       ELSE MAKE SURE OUR LINK IS CLOSED
          SIM
WSTRT     CALL  GETCHR
          JZ    WSTRT
          CPT   STCHR          START CHAR ?
          JNZ   WSTRT
          CALL  GETCHR
          MOV   B,A
          ANT   0FFH           MASK BTT0 BECAUSE MAY BE TO CRT OR KEYBOARD
          CMP   C              TO US?
          JNZ   GAP            NOPE GET GAP
          CALL  GETCHR         REDUNDANT CHAR
          CMP   B
          JNZ   GAP            NOT TO US
          STA   RECDEV         DEVICE ADDRESS SAVED FOR ACK TEST BELOW
          LXI   D,0            ZERO LRC,HASH
          LXT   H,INBUFF       INPUT BUFFER
          CALL  RDATA          GET DATA
          DCX   H              CHECK LRC,HASH
          MOV   A,M
          CMP   D              INPUT(HASH)=CALC(LRC)
          JNZ   NAK
          ADD   A              CALC(HASH)=2*INPUT(HASH)+INPUT(LRC)
          DCX   H
          ADD   M
          CMP   E
          JNZ   NAK
          MVT   M,EOBUF        MARK END OF COMMAND
          LDA   RECDEV
          ANI   1              SEE IF CRT OR KEYB ADDRESS
          JNZ   ADKB
          LDA   SYSREQ         SEE IF CRT BUSY ALREADY
ADTBUSY   ORA   A
          JNZ   ADBUSY         SEND BUSY IF SO
          JMP   ACK            ELSE ACK
ADKB      LDA   COMMAND        CLEAR BUFFER COMMAND OVERRIDES RESPONSE
          ANI   CLRBUF
          JNZ   ACK
          LDA   KEYMASK        ELSE IF WAITING FOR A KEY THEN SEND BUSY
          JMP   ADTBUSY
ADBUSY    MVT   B,BSYCHR
          JMP   ACKNAK
ACK       MVI   B,ACKCHR       ACK SENDER
ACKNAK    MVI   A,BRKCHR       BREAK THE LINK FOR RESPONSE
          SIM
          MVT   A,STCHR        START CHAR
          OUT   ALOUT

MOV   A,B
          CALL  PUTCHR
          CALL  PUTCHR
          MVT   A,27           WAIT FOR CHARS TO COMPLETE BEFORE CLOSE
          DCR   A
          JNZ   $-1
          MVT   A,FIXCHR       CLOSE LINK AGAIN
          SIM
          RET
NAK       MVT   B,NAKCHR       NAK SENDER
          CALL  ACKNAK
          JMP   GAP
RDATA     MVI   B,CHRDLY       READ DATA
RDTIM     IN    ALSTAT         WAIT TILL A CHAR TIME PASSES
          ANI   ALDR
          JNZ   RGOT
          DCR   B
          JNZ   RDTIM
          RET
RGOT      IN    ALIN           SAVE CHAR
          MOV   M,A
          XRA   D              CALC    LRC
          MOV   D,A
          MOV   A,M
```

```
                ADD     E                       CALC HASH
                MOV     F,A
                INX     H
                JMP     RDATA
GETCHR          MVI     D,TIMO
GETCHR1         IN      ALSTAT                  READ A CHAR FROM ALINE
                ANI     ALDR
                JNZ     GETCHR2
                DCR     D
                JNZ     GETCHR1
                RET
GETCHR2         IN      ALIN
                RET
PUTCHR          PUSH    PSW                     OUTPUT A CHAR TO ALINE
                IN      ALSTAT
                ANI     ALTBR
                JZ      PUTCHR+1
                POP     PSW
                OUT     ALOUT
                RET
BREAK           IN      ALSTAT                  MAKE SURE NO CHAR HAS COME IN MEAN TIME
                ANI     ALDR
                JNZ     RCHR
                MVI     A,BRKCHR                BREAK LINK FOR TRANSMIT
                SIM
                MVI     B,GAPSND                WAIT SENDING GAP TIME BEFORE SENDING
BRKSND          IN      ALSTAT
                ANI     ALDR
                JNZ     RCHR
                DCR     B
                JNZ     BRKSND
BID             MVI     A,CLOSEL                REQUEST THAT LINK BE CLOSED
                OUT     ALOUT
                IN      ALNADR                  AND BID
                MOV     C,A
                CALL    PUTCHR
IDIN            CALL    GETCHR                  NOW WAIT FOR CLOSE LINK CHAR TO COME
                JZ      GAP
                CPI     CLOSEL

JNZ     READAL
                CALL    GETCHR                  GET BID ADDRESS. IF NOTE COMES THEN ERROR
                JZ      GAP
                CMP     C                       CHECK IF BID WON LOST
                JM      RCLOSE                  LOST BID
                JZ      BIDWON
                MVI     B,16                    100 MICROSEC DELAY TO ALLOW LINKS TO BE CLOSED
BIDDLY          DCR     B
                JNZ     BIDDLY
                JMP     BID
BIDWON          CALL    SEND
                MVI     A,BRKCHR                MAKE SURE LINK IS OPEN
                SIM
                JNZ     READAL                  Z BIT CLEAR INDICATES NAK'D TRANSMISSION
                JMP     SETNAK                  ELSE GOOD TRANS. RESET NAKS
*               Z BIT SET INDICATES GOOD TRANSMISSION
SEND            LHLD    MESSAGE                 GET MESSAGE TO SEND
                MOV     C,M                     GET LENGTH
                INX     H
                MVI     A,BRKCHR                BREAK LINK FOR RESPONSE
                SIM
                MVI     A,STCHR                 START CHAR
                OUT     ALOUT
                LDA     TOADR                   GET SENDERS ADDRESS TO WHOM REPLY GOES
                CALL    PUTCHR                  TO ADDRESS
                CALL    PUTCHR                  REDUNDANT TO ADDRESS
                LDA     DEVADR                  FROM ADDRESS
                CALL    PUTCHR
                MOV     D,A                     START LRC,HASH
                MOV     F,A
SNDLOP          MOV     A,M                     SEND NEXT CHAR
                CALL    PUTCHR
```

```
             ADD      E                        HASH CALC
             MOV      F,A
             MOV      A,M
             XRA      D                        LRC CALC
             MOV      D,A
             DCR      C
             INX      H
             JNZ      SNDLOP
             CALL     PUTCHR                   SEND LRC
             MOV      A,E
             CALL     PUTCHR                   SEND HASH
             MVI      C,CHRDLY                 CLEAR UART OF CHARS CRT SENT ON LINK
CLRUART      IN       ALSTAT
             ANI      ALDR
             JZ       CLRDEC
             IN       ALIN                     CLEAR THEN CHAR
             JMP      CLRUART-2
CLRDEC       DCR      C
             JNZ      CLRUART
             MVI      C,TIM1                   WAIT TILL TIMEOUT1 FOR RESPONSE
RESP         IN       ALSTAT
             ANI      ALDR
             JNZ      RAKNAK                   SEE IF ACK/NAK
             DCR      C
             JNZ      RESP
             MVI      C,TIM0                   SINCE NO RESPONSE TEST LINK FOR DOWN
             MOV      A,TSTCHR
             CALL     PUTCHR
TSTLNK       IN       ALSTAT
             ANI      ALDR
             JNZ      RNAK

DCR      C
             JNZ      TSTLNK
             INR      C                        CLEAR Z BIT TO SHOW BAD TRANSMISSION
             RET                               RETURN LEAVING SEND MESSAGE SYSREQ SET FOR RETR
RAKNAK       LXI      H,RESBUF                 GET RESPONSE
             MVI      A,FIXCHR                 CLOSE LINK FOR RESPONSE
             SIM
             CALL     RDATA
             LXI      H,RESBUF                 SEE IF VALID RESPONSE
             MOV      A,M                      MUST START WITH START CHAR
             CPI      STCHR
             RNZ
             MVI      C,2
RAK1         MOV      A,M                      TEST IF RESPONSE IS ACK
             CPI      ACKCHR
             JZ       RACK
             CPI      BSYCHR                   OR BUSY (LIKE MASTER HAS POWERED UP AFTER FAIL)
             JZ       RACK
             INX      H
             DCR      C
             JNZ      RAK1
             MVI      A,BRKCHR                 NO REC. RESP. SO MAKE SURE LINK IS BROKEN
             SIM
RNAK
             LDA      NAKS
             DCR      A                        CHECK FOR TOO MANY NAKS
             STA      NAKS
             RNZ               RETURN WITH Z BIT RESET TO SHOW NAK
RACK         LDA      DEVADR                   WHICH DEVICE IS DONE ?
             ANI      1
             JNZ      CLKEY
             STA      SYSREQ                   EVEN ADDRESS IS CRT
             RET
CLKEY        XRA      A                        ODD IS KEYBOARD
             STA      KEYMASK
             RET
***********************************************************
             DS       20
STACK        DS       2
NAKS         DS       1        NAK COUNT
```

```
TOADR     DS   1      ADDRESS TO SEND RESPONSE TO
TOADRKR   DS   1      ADDRESS TO SEND KEY TO
KEYMASK   DS   1      FLAG USED TO HANDLE KEY PROCESSING
RECDFV    DS   1      SAVE AREA FOR ADDRESSED RECEIVED AS DEVICES
DEVADR    DS   1      WHICH DEVICE SENDS DATA (CRT,KEYBOARD)
MESSAGE   DS   2      POINTER AT BUFFER OF DATA TO SEND
RESBUF    DS   3
KEYBUF    DS   3      BUFFER FOR KEY 0=LEN,1=STATUS 2=KEY
FROMAD    DS   0      FROM ADDRESS IN INPUT
INBUFF    DS   1      INPUT BUFFER
COMMAND   DS   1
DATA      DS   800
```

It will be apparent that many modifications and variations may be effected without departing from the scope of the novel concepts and teachings of the present invention.

What is claimed is:

1. The method of effecting communication between nodes of a closed loop communication path including the nodes, wherein each node includes a transmission link switch which when in a first mode completes a link of the closed loop communication path and when in a second mode prevents an undelayed complete loop transmission, said method comprising (a) at a node desiring to initiate communication as a bidding node,
   (a1) monitoring the closed loop communication path for a gap in communication along the closed loop communication path of a defined time span,
   (a2) and upon detection of such a communication gap shifting the transmission link switch at the bidding node to its second mode, and
   (a3) transmitting a bid message in a given direction about the closed loop communications path from the bidding node,
(b) at each of the nonbidding nodes upon receipt of the bid message from a bidding node, insuring that the transmission link switch of such nonbidding node is in its first mode,
(c) at the bidding node monitoring the closed loop communication path for the bid message as an indication of a successful bid,
(d) upon a successful bid at a bidding node, transmitting a data message intended for at least one recipient node from the bidding node via the closed loop communication path while the transmission link switch of the bidding node is in the second mode,
(e) at a recipient node upon receipt of the data message
   (e1) placing its transmission link switch in the second mode, and
   (e2) transmitting a response via the closed loop communication path, and
(f) at the bidding node shifting the transmission link switch to the first mode with a timing to prevent a communications gap of a predetermined time duration during reception of the response and thereafter upon receipt of the response placing the transmission link switch of the bidding node in said second mode.

2. In a closed loop data processing network,
(a) a series of nodes having data processing units associated therewith each having a data input and a data output, and requiring at least one processing step in transmitting data between its data input and its data output,
(b) a series of communication links coupling the nodes in a loop communications path for enabling data communication therebetween, and including an incoming link path and an outgoing link path at each node,
(c) transmission link switches at the respective nodes each having a first transmission mode and a second cutoff mode,
(d) each transmission link switch in said first transmission mode providing a switch path directly coupling the incoming and outgoing link paths at the respective associated node so as to provide for undelaying data transmission independent of the data processing unit associated with the node,
(e) each transmission link switch in said cutoff mode serving to interrupt said switch path such that the incoming and outgoing link paths at the respective associated node are not coupled via said switch path but are only coupled via the data input and the data output of the associated data processing unit, and
(f) control means associated with each data processing unit for placing the associated transmission link switch in cutoff mode during the transmission of a data message from the data processing unit, while assuring against a communications gap of a predetermined time duration during reception of a response to the transmitted data message, and
(g) the control means at a node which has transmitted a data message switching its transmission link switch to the first transmission mode with a timing to prevent a communications gap of the predetermined time duration during reception of the response.

3. A closed loop data processing network according to claim 2, with said data input of each data processing unit having means for monitoring to detect a communications gap of a predetermined time duration during which there is an absence of data transmission along the associated switch path.

4. A closed loop data processing network according to claim 3, with said control means of each data processing unit when having a data message to transmit, being responsive to detection of a communications gap of a predetermined time duration to shift the associated transmission link switch to cutoff mode, and to transmit a bid message for seeking control of communication via the loop communications path.

5. A closed loop data processing network according to claim 4, with said control means of each data processing unit being operable after sending a bid message to monitor its data input for receipt of its own bid message as indicating a successful bid for control of communication, and upon recognition of its successful bid being operable to send its data message without allowing a communications gap of said predetermined duration of any of the other nodes.

6. A closed loop data processing network according to claim 2, with each data processing unit having an assigned address and said control means thereof being operable in response to receipt of a data message with its assigned address to shift its transmission link switch to cutoff mode, to transmit a response, and to execute a time delay sufficient to ensure that the data processing unit sending the data message has time to determine that a response is being sent, before shifting the transmission link switch at the addressed data processing unit to the transmission mode.

7. A closed loop data processing network according to claim 5, with said control means of a data processing unit after having made a successful bid and having sent its data message, being operable upon receipt of a first part of a response to its data message to shift its transmission link switch to transmission mode, and being operable upon receipt of a further part of a response to shift its transmission link switch to cutoff mode so as to interrupt further signal propagation via the switch path.

8. A closed loop data processing network according to claim 2, with said control means of said data processing units being operable to recognize data messages directed thereto from other units and to respond thereto, each of the control means of said data processing units being operable in response to a data message directed thereto to shift the associated transmission link switch to cutoff mode, send the response, and execute a time delay of sufficient duration to prevent the response from traversing the loop communications path more than once.

9. The method of effecting communication between nodes of a loop communication path, wherein each node includes a transmission link switch which when in a first mode completes a link of the loop communication path and when in a second mode prevents an undelayed complete loop transmission, said method comprising (a) at a node desiring to initiate communication
  (a1) monitoring the loop communication path for a gap in communication along the loop communication path of a defined time span,
  (a2) and upon detection of such a communication gap shifting the transmission link switch at the node to its second mode, and
  (a3) transmitting a bid message in a given direction about the loop communication path from the node, which becomes a bidding node,
(b) at each of the nonbidding nodes upon receipt of a bid message from a bidding node, insuring that the transmission link switch of such nonbidding node is in its first mode,
(c) at the bidding node monitoring the loop communication path for the bid message as an indication of a successful bid,
(d) upon a successful bid at a bidding node, transmitting a data message intended for at least one recipient node from the bidding node via the loop communication path while the transmission link switch of the bidding node is in the second mode,
(e) at a recipient node upon receipt of the data message
  (e1) placing its transmission link switch in the second mode, and
  (e2) transmitting a response via the loop communication path, and
(f) operating the transmission link switches at the recipient node and at the bidding node so as to prevent repeated circulation of the response while avoiding the appearance of a communication gap at the other nodes during transmission of the response from the recipient node to the bidding node.

* * * * *